(12) United States Patent
Okubo et al.

(10) Patent No.: US 7,402,369 B2
(45) Date of Patent: Jul. 22, 2008

(54) MONO AZO IRON COMPLEX COMPOUND, AND CHARGE CONTROLLING AGENT AND TONER USING THE SAME

(75) Inventors: Masaki Okubo, Koriyama (JP); Hideyuki Otsuka, Koriyama (JP); Kazuo Nemoto, Koriyama (JP); Masami Ito, Koriyama (JP); Eisuke Yamada, Koriyama (JP)

(73) Assignee: Hodogaya Chemical Co., Ltd., Kanagawa (JP)

( * ) Notice: Subject to any disclaimer, the term of this patent is extended or adjusted under 35 U.S.C. 154(b) by 0 days.

(21) Appl. No.: 11/540,788

(22) Filed: Sep. 29, 2006

(65) Prior Publication Data

US 2007/0020547 A1     Jan. 25, 2007

Related U.S. Application Data

(63) Continuation of application No. PCT/JP2005/006156, filed on Mar. 30, 2005.

(30) Foreign Application Priority Data

Mar. 30, 2004  (JP) .............................. 2004-101125
Jul. 28, 2004  (JP) .............................. 2004-220192

(51) Int. Cl.
*G03G 9/08*    (2006.01)
(52) U.S. Cl. .................... 430/108.23; 534/613; 534/581
(58) Field of Classification Search ............ 430/108.23; 534/613, 581
See application file for complete search history.

(56) References Cited

U.S. PATENT DOCUMENTS

| 5,529,872 | A | 6/1996 | Grychtol et al. | |
| 7,094,512 | B2 * | 8/2006 | Otsuka et al. ......... | 430/108.23 |
| 2002/0055053 | A1 * | 5/2002 | Kasuya et al. ......... | 430/108.23 |
| 2004/0191660 | A1 * | 9/2004 | Otsuka et al. ......... | 430/108.23 |

FOREIGN PATENT DOCUMENTS

| JP | 61 155464 | | 7/1986 |
| JP | 11-020317 | | 1/1999 |
| JP | 2001-083744 | | 3/2001 |
| JP | 2002-264521 | | 9/2002 |
| JP | 2004 86224 | A | 3/2004 |
| JP | 2005264157 | A * | 9/2005 |

* cited by examiner

*Primary Examiner*—Christopher RoDee
(74) *Attorney, Agent, or Firm*—Hoffmann & Baron, LLP

(57) ABSTRACT

The present invention is to provide a charge controlling agent and negatively chargeable toner that do not contain any toxic metal, are essentially free from the risk of evoking ignition or explosion, and can exhibit a high charge amount and rapid initial increase in charging.

The charge controlling agent is a mono azo iron complex compound represented by Formula (1):

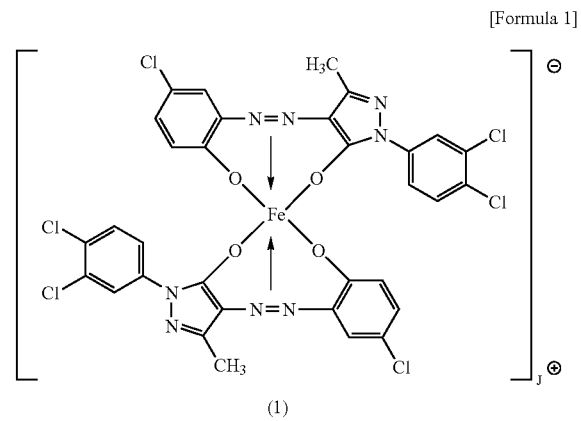

wherein J represents H, alkali metal, ammonium, or alkyl ammonium, or two or more of those elements in combination.

10 Claims, 7 Drawing Sheets

MONO AZO IRON COMPLEX COMPOUND, AND CHARGE CONTROLLING AGENT AND TONER USING THE SAME

CROSS-REFERENCE TO RELATED APPLICATIONS

This is a continuation of International Application No. PCT/JP2005/006156, filed Mar. 30, 2005, which claims the benefit of Japanese Application No. JP 2004-220192, filed Jul. 28, 2004, and Japanese Application No. JP 2004-101125, filed Mar. 30, 2004.

TECHNICAL FIELD

The present invention relates to a charge controlling agent, and a negatively chargeable toner containing such a charge controlling agent to be used for an image forming unit, which is operated to develop an electrostatic latent image in the fields of electrophotography, electrostatic recording, etc.

BACKGROUND

The image formation process by electrophotography involves forming an electrostatic latent image on a photosensitive body made of an inorganic or organic material, developing therefrom a toner image using a toner, transferring the toner image to paper or plastic film, and fixing the image thereon to provide a visible image. The photosensitive body is negatively or positively chargeable depending on its mechanism. When a printing character portion is left as an electrostatic latent image after exposure to light, a toner chargeable with electricity having the opposite polarity is used for developing a toner image. On the other hand, when the reversal development is performed by depriving a printing character portion of electricity while keeping the rest charged with electricity of one polarity after exposure to light, a toner chargeable with electricity of the same polarity is used for developing a toner image.

The toner contains a binding resin, a coloring agent, and other additives. Generally, the toner is further supplemented with a charge controlling agent so that it may be conferred therewith desired charging properties (charging speed, charge level, charge stability, etc.), storage stability, endurance to the change of environment, and the like. The performance of a toner may be greatly improved through the addition of such a charge controlling agent.

Suitable charge controlling agents previously proposed and actually employed for improving the negative charge controllability of a toner include mono azo metal complex compounds where the central metal is chromium, mono azo metal complex compounds where the central metal is iron, and metal complexes of alkylsalicylic acid or of aromatic oxycarboxylic acid, or their salts.

However, these charge controlling agents have the following problems. For example, they are not sufficiently affinitive to a binding resin of a toner, do not have a sufficient power to provide tribocharge, or do not allow the toner to be charged in a sufficiently short time (rate of initial increase in charging), and accordingly, images obtained at the initial phase of copying are short of clearness, or the quality of images is apt to fluctuate during continuous copying. Furthermore, if the charge controlling agent is composed of a metal complex or salt of alkylsalicylic acid or aromatic oxycarboxylic acid, the toner incorporating such a charge controlling agent greatly alters its charging performance depending on environmental conditions. Thus, the quality of images varies significantly depending on which time of the year they are copied.

Indeed there are some among mono azo chromium complex compounds that are sufficiently improved to be free from part of the aforementioned defects affecting the performance of toner. However, even such compounds, when they are burnt for disposal, may have the risk of producing hexavalent chromium or a harmful substance which may have adverse effects on the environment and human body, although the production amount of such toxic substance is likely to be minute. A toner incorporating a charge controlling agent containing a complex whose central metal is iron, instead of a complex whose central metal is chromium, has been disclosed (for example, see the following patent document 1). The toner incorporating such a metal complex has a sufficiently high charge level to be practical (at least $-10$ $\mu c/g$), but its initial increase in charging is lower than that of a corresponding toner incorporating a chromium complex. In addition, the lowering of charge level observed when the toner is exposed to a highly moist environment remains still unsolved.

Some azo iron complexes have also been disclosed (for example, see the following patent document 2). Of the complexes, those that ensure high performance are all azo complexes comprising two or more nitro groups. Thus, synthesis of such complex compounds is exposed at all times to the danger of ignition/explosion. The risk of ignition/explosion is particularly increased during the synthesis of complexes whose central metal is iron, and drying and pulverizing steps are extremely dangerous. Pulverized toners are generally produced by putting the material into an extrusion kneader, kneading the material, and pulverizing the kneaded material. Thus, it is not always unlikely that the powder explodes during the manufacture of the toner. As far as complexes whose central metal is chromium are concerned, the likeliness of ignition/explosion is low. Of them, however, the majority of azo chromium complexes comprising two or more nitro groups are self-reactive (Class V dangerous substances).

An iron complex having a pyrazolone skeleton is disclosed (for example, see the following patent document 3), although its application is directed towards the production of an optical information recording medium. Another iron complex having a pyrazolone skeleton is disclosed (for example, see the following patent document 4) which is used as an additive to toner. These pyrazolone compounds generally include compounds in which a phenyl group attached to a nitrogen atom of a pyrazolone ring has two or more substituent groups. However, the above patent documents do not give any mention or suggestion, in concrete terms, about a pyrazolone compound in which a phenyl group comprises two chlorine atoms at specified positions.

Patent Document 1: JP Kokai No. Sho 61-155464
Patent Document 2: JP Kohyo No. Hei 8-500912
Patent Document 3: JP Kokai No. Hei 11-20317
Patent Document 4: JP Kokai No. 2004-86224

DISCLOSURE OF THE INVENTION

Object to be Attained by the Invention:

The present invention aims to provide a novel pyrazolone mono azo iron complex compound which does not comprise any toxic metal such as chromium, is essentially free from the risk of evoking ignition or explosion in contrast with nitrogroup containing compounds, and exhibits excellent performance as a charge controlling agent as compared with conventional pyrazolone mono azo iron complex compounds.

Another object of the present invention is to provide a negatively chargeable toner capable of exhibiting a high charge level and markedly rapid initial increase in charging, by providing a charge controlling agent which can greatly enhance the accumulation of charge, and by adding the charge controlling agent to the toner. Yet another object of the present invention is to provide a negatively chargeable toner capable of exhibiting a high charge level and markedly high initial increase in charging even when it incorporates the present charge controlling agent at a low concentration.

Means for Attaining the Object:

To achieve the above objects, the present inventors have made intensive studies, found that a novel pyrazolone mono azo iron complex compound has an excellent property of greatly enhancing the accumulation of charge, and attained the present invention based on the finding.

Namely, the present invention relates to mono azo iron complex compounds represented by Formula (1) below:

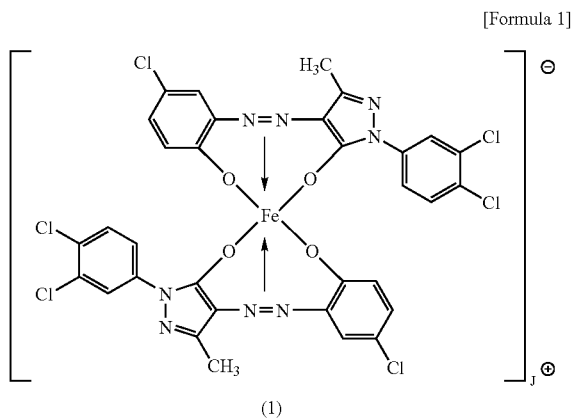

[Formula 1]

(1)

wherein J represents H, alkali metal, ammonium, or alkyl (1 to 8 carbon atoms) ammonium, or two or more of the above elements in combination.

Further, the present invention relates to a charge controlling agent comprising, as an active ingredient, the mono azo iron complex compound represented by Formula (1). Still further, the present invention relates to a negatively chargeable toner comprising the mono azo iron complex compound represented by Formula (1), a coloring agent, and a binding resin.

By incorporating a charge controlling agent comprising, as an active ingredient, the mono azo iron complex compound represented by Formula (1), a negatively chargeable toner can exhibit a charge level exceeding 25 μC/g, that is significantly higher than that of conventional toners. Despite that the toner has a high charge level, it has a rapid initial increase in charging. In addition, even if the toner contains the charge controlling agent at a concentration as low as 1.0 mass % or lower, it can still exhibit a markedly high charge level. Further, even if the toner contains the charge controlling agent at such a low concentration, it can exhibit a markedly rapid initial increase in charging, despite that its charge level is high.

As stated above, the negatively chargeable toner of the present invention, despite that its charge level is high, can exhibit a high rate of initial increase in charging. Therefore, it is possible for an inventive toner, when it is applied to a photocopier or printer, to allow for compaction of the machine, its high speed operation, and contraction of wait time.

Since a toner comprising a mono azo iron complex compound of the present invention hardly alters its charge performance even when exposed to an environment of high temperature and high humidity or to an environment of low temperature and low humidity, it has an excellent stability to the variation in use environment. Since a negatively chargeable toner according to the present invention is highly stable to the variation in environment as stated above, it will ensure the standardized use of a copier with which it is used in combination, regardless of the nationality of its use place, of the country or region in which the copier is used, that is, regardless of climate under which the copier is operated.

The mono azo iron complex compound of the present invention exhibits an excellent dispersion tendency during the manufacture of toner. Because of this, the toner incorporating the present iron complex compound is essentially relieved of the lowering of saturation charge level which would otherwise result from the variation of dispersion, and of the separation of charge controlling agent (to be also referred to as "CCA" hereinafter) from toner. The present iron complex compound does not adversely affect the dispersion of coloring agents used in combination either. Thus, use of an iron complex compound of the present invention makes it possible to widen the selection range of coloring agents, reduce the size of toner particles, and ensure the stable production of toner.

Thanks to the features as described above, the toner of the present invention, when used in combination with a copier, can ensure the reproduction of images that are free from fogging, faithful in optical density, and excellent in dot and thin line reproduction, and, as a consequence of these merits, reproduction of clear images.

Effect of the Invention:

Since a negatively chargeable toner comprising a charge controlling agent which contains, as an active ingredient, the present mono azo iron complex compound can exhibit a markedly high charge level exceeding 25 μC/g, and provide a high rate of initial increase in charging despite its exhibiting a high charge level, the toner is suitably used in combination with a copier for reproducing high quality images. Since the present negatively chargeable toner can exhibit a markedly high initial increase in charging in spite of its charge level being high, even when its content of a charge controlling agent is as low as 1.0 mass % or lower, the inventive toner, when it is applied to a photocopier or printer, allows for compaction of the machine, its high speed operation, contraction of wait time, and reduced consumption of charge controlling agent. Since the negatively chargeable toner of the invention is highly stable to the variation of environment, it will ensure the standardized use of a copier with which it is used in combination, regardless of the nationality of its use place, of the country or region in which the copier is used, that is, regardless of climate under which the copier is operated. The present mono azo iron complex compound is easily kneaded and dispersed during the manufacture of toner. Thus, use of the present iron complex compound makes it possible to widen the selection range of coloring agents, reduce the size of toner particles, and ensure the stable production of toner.

Since the charge controlling agent of the present invention does not contain any metal such as chromium that may have adverse effects on the environment, and does not comprise any ignition-prone substituent group such as a nitro group, it is highly safe.

BEST MODE FOR CARRYING OUT THE INVENTION

With regard to the compounds represented by Formula (1), alkali metals represented by J may include alkali metals such as lithium, sodium, potassium, and the like. Suitable alkyl groups constituting alkylammonium may include linear or branched chain alkyl groups having 1 to 8, or preferably 1 to 4 carbon atoms.

The present mono azo iron complex compounds can be produced based on any publicly known methods for producing mono azo complex compounds. Some representative methods out of them will be described below. First, to a diazo component of 4-chloro-2-aminophenol, is added a mineral acid such as hydrochloric acid or sulfuric acid, and the mixture is cooled to 5° C. or lower. Then, sodium nitrite dissolved in water is added dropwise to the mixture kept at an internal temperature of 10° C. or lower. Keeping the system at 10° C. or lower and stirring it for 30 minutes to 3 hours cause the system to undergo reaction through which 4-chloro-2-aminophenol is converted into a diazo compound. To the yield is added sulfamic acid, and checking the system for the presence of excess nitrite is achieved by adding potassium iodide and then starch paper to the system.

Next, 3-methyl-1-(3,4-dichlorophenyl)-5-pyrazolone as a coupling component, an aqueous solution of sodium hydride, sodium carbonate, and an organic solvent such as n-buthanol are combined, and stirred at room temperature until the components are dissolved. To the mixture is added the diazo compound by pouring, and the system is kept at room temperature for several hours with stirring to allow coupling reaction to proceed. After stirring, as soon as it is confirmed that the diazo compound does not react with resorcinol any longer, the reaction is determined to be completed. After the addition of water, the system is thoroughly stirred, left to stand, and decanted. Further, the solution, after addition of aqueous solution of sodium hydroxide, is stirred and washed, and decanted.

Suitable organic solvents to be used in the coupling reaction may include, in addition to n-buthanol, any usable solvents, but preferably monohydric alcohol, dihydric alcohol, ketone organic solvents, etc. Suitable monohydric alcohols may include methanol, ethanol, n-propanol, 2-propanol, isobutyl alcohol, sec-butyl alcohol, n-amyl alcohol, isoamyl alcohol, ethyleneglycol monoalkyl (1-4 carbon atoms) ether, etc. Suitable dihydric alcohols may include ethylene glycol, propylene glycol, etc. Suitable ketone organic solvents may include methyl ethyl ketone, methyl isobutyl ketone, etc.

To a solution of a mono azo compound as described above dissolved in n-buthanol, are added water, salicylic acid, n-buthanol, and sodium carbonate, and the mixture is stirred. To the mixture, are added an aqueous solution of ferric chloride, and sodium carbonate by pouring. The system is heated to an internal temperature of 30 to 40° C., and reaction is traced by TLC. Five to ten hours later, as soon as it is confirmed that the spot of original material is totally lost, the reaction is determined to be completed. After the cessation of stirring, the system is left to stand, and decanted. Further, to the resultant material, are added water, n-butanol, and an aqueous solution of sodium hydroxide, and then alkali-washed. The resultant product is filtered, and the cake is collected and washed with water.

To attach an arbitrarily chosen counter ion, water is added, for example, to tetra butyl ammonium bromide, and the mixture is heated with stirring until its internal temperature becomes 85 to 90° C. Then, a suspension where the above cake is dispersed is added dropwise to the mixture, and the system is kept at 97 to 99° C. for 1 hour with stirring. After cooling and filtering out, the cake is washed with water. It is confirmed that the cake is dried in vacuo to the constant amount. Thus, the present mono azo iron complex compound is obtained.

Then, some specific examples of the present mono azo iron complex compound will be listed below. The counter ion Bu of Formula (5) represents an n-butyl group, and the counter ion M of Formula (6) represents a mixture of ammonium (90%), Na (3%), and H (7%) by weight.

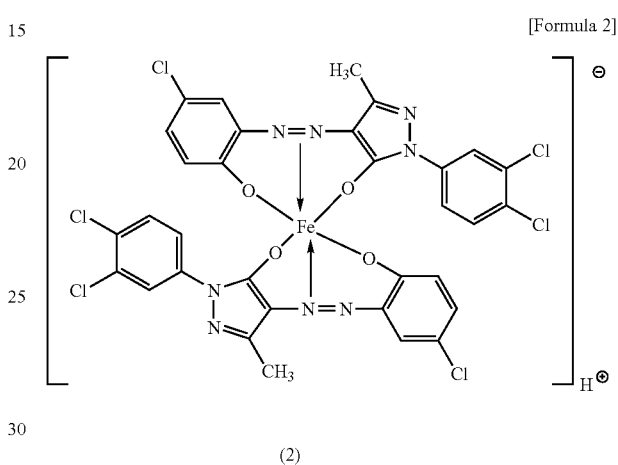

[Formula 2]

(2)

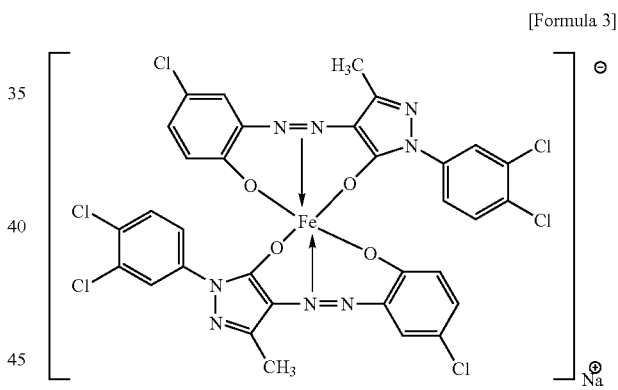

[Formula 3]

(3)

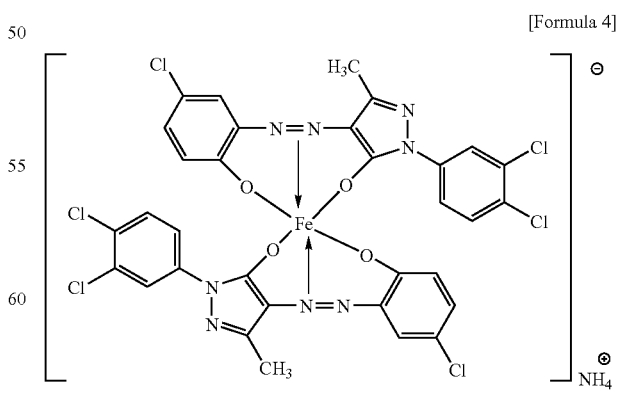

[Formula 4]

(4)

-continued

[Formula 5]

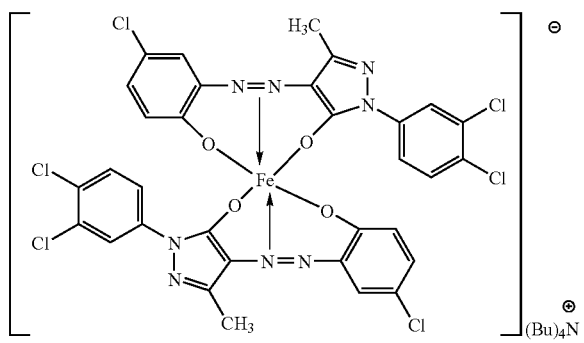

(5)

[Formula 6]

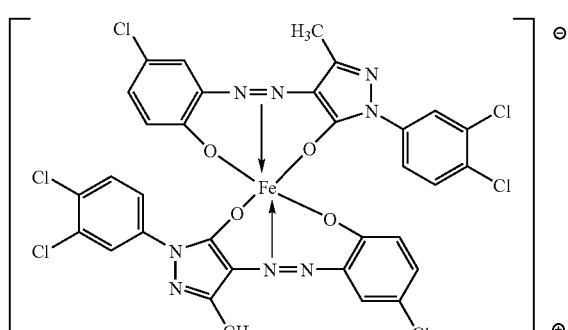

(6)

The present charge controlling agent is preferably the mono azo iron complex compound represented by Formula (2) above. One or two or more mono azo iron complex compounds represented by Formulas (2) to (6) above may be used in combination. Preferred combination of the counter ions includes H and $NH_4$, Na and $NH_4$, and H, Na and $NH_4$. Preferred alkali metal includes Li, Na, and K, particularly Na. The most preferred counter ion represented by J is H.

The present charge controlling agent may include, in addition to the above complex compound, unreacted material compounds or intermediates, or a reaction accelerator such as salicylic acid, at a concentration not larger than 10%.

The inventive charge controlling agent is preferably controlled to have a volume average particle diameter of 0.1 to 20 µm, preferably 0.1 to 10 µm, before it is added to a toner. When the volume average particle diameter is smaller than 0.1 µm, the amount of the charge controlling agent appearing on the toner surface would be too limited to exert an expected charge controlling activity. On the contrary, when the average particle diameter is larger than 20 µm, the amount of charge controlling agent separated or dropped off from the toner would be increased so much as to soil the interior of the copying machine. The present charge controlling agent is easily dispersed by kneading during the manufacture of the toner. Because of this, the toner incorporating the present iron complex compound is essentially relieved of the lowering of saturation charge level which would otherwise result from the variation of dispersion, and of the separation of CCA from toner.

Admixture of the present mono azo iron complex compound serving as a charge controlling agent to a toner may comprise adding the iron complex compound together with a binding resin and a coloring agent to a toner, kneading the mixture, and pulverizing the mixture (pulverized toner), or adding the mono azo iron complex compound to a polymerizable monomer, and polymerizing the monomer (polymerized toner). These methods include adding an iron complex compound to the interior of individual toner particles (internal addition method). On the other hand, there are methods that include adding an iron complex compound to the surface of individual toner particles (external addition method). The present mono azo iron complex compound is preferably added, when added internally, in an amount of 0.1 to 5 parts by mass, more preferably 0.25 to 2 parts by mass per 100 parts by mass of the binding resin. Similarly, the present mono azo iron complex compound is preferably added, when added externally, in an amount of 0.01 to 5 parts by mass, more preferably 0.01 to 2 parts by mass. The present mono azo iron complex compound is preferably bound to the surface of individual toner particles.

The charge controlling agent containing the present mono azo iron complex compound as an active ingredient may be combined with another known negatively chargeable charge controlling agent. Suitable charge controlling agent to be used in combination may include azo iron complexes other than the present azo iron complexes, and their salts, azo chromium complexes and their salts, azo manganese complexes and their salts, azo cobalt complexes and their salts, azo zirconium complexes and their salts, carboxylic acid derivative coordinated chromium complexes and their salts, carboxylic acid derivative coordinated zinc complexes and their salts, carboxylic acid derivative coordinated aluminum complexes and their salts, and carboxylic acid derivative coordinated zirconium complexes and their salts. Suitable carboxylic acid derivatives may include aromatic hydroxycarboxylic acid, more preferably, 3,5-di-tert-butylsalicylic acid. Suitable charge controlling agent to be used in combination may further include boron complexes and their salts, negatively chargeable resin type charge controlling agents, etc.

When the present charge controlling agent is used in combination with another different charge controlling agent, the charge controlling agent other than the present charge controlling agent comprising the mono azo iron complex is preferably added in an amount of 0.1 to 10 parts by mass per 100 parts by mass of the binding resin.

Suitable binding resins to be used for the invention may include any one chosen from conventional various binding resins. Suitable binding resins may include, for example, vinyl polymers composed of styrene monomers, acryl monomers, or methacryl monomers, copolymers composed of two or more chosen from the above monomers, polyester polymers, polyol resin, phenol resin, silicon resin, polyurethane resin, polyamide resin, furan resin, epoxy resin, xylene resin, turpentine resin, cumarone-indene resin, polycarbonate resin, petroleum-based resin, etc.

Styrene monomers, acryl monomers and methacryl resins forming vinyl polymers or copolymers will be further described below for illustration.

Suitable styrene monomers may include styrenes such as styrene, o-methylstyrene, m-methylstyrene, p-methylstyrene, p-phenylstyrene, p-ethylstyrene, 2,4-dimethylstyrene, p-n-amylstyrene, p-tert-butylstyrene, p-n-hexylstyrene, p-n-octylstyrene, p-n-nonylstyrene, p-n-decylstyrene, p-n-dodecylstyrene, p-methoxylstyrene, p-chlorostyrene, 3,4-dichlorostyrene, m-nitrostyrene, o-nitrostyrene, p-nitrostyrene, etc., and their derivatives.

Suitable acryl monomers may include acrylic acid and acrylates such as methyl acrylate, ethyl acrylate, propyl acrylate, n-butyl acrylate, isobutyl acrylate, n-octyl acrylate, n-dodecyl acrylate, 2-ethylhexyl acrylate, stearyl acrylate, 2-chloroethyl acrylate, phenyl acrylate, and their esters.

Suitable methacryl monomers may include methacrylic acid and methacrylates such as methyl methacrylate, ethyl methacrylate, propyl methacrylate, n-butyl methacrylate, isobutyl methacrylate, n-octyl methacrylate, n-dodecyl methacrylate, 2-ethylhexyl methacrylate, stearyl methacrylate, phenyl methacrylate, dimethylaminoethyl methacrylate, and diethylaminoethyl methacrylate, and their esters.

Suitable other monomers constituting vinyl polymers or copolymers may include any one chosen from the following groups (1) to (18): (1) monoolefins such as ethylene, propylene, butylene, isobutylene, etc.; (2) polyenes such as butadiene, isoprene, etc.; (3) vinyl halides such as vinyl chloride, vinylidene chloride, vinyl bromide, vinyl fluoride, etc.; (4) vinyl esters such as vinyl acetate, vinyl propionate, vinyl benzoate, etc.; (5) vinyl ethers such as vinyl methyl ether, vinyl ethyl ether, vinyl isobutyl ether, etc.; (6) vinyl ketones such as vinyl methyl ketone, vinyl hexyl ketone, methyl isopropenyl ketone, etc.; (7) N-vinyl compounds such as N-vinylpyrrol, N-vinylcarbazol, N-vinylindol, N-vinylpyrrolidone, etc.; (8) vinylnaphthalenes; (9) acrylic acid or methacrylic acid derivatives such as acrylonitrile, methacrylonitrile, acrylamide, etc.; (10) unsaturated dibasic acids such as maleic acid, citraconic acid, itaconic acid, alkenylsuccinic acid, fumaric acid, methaconic acid, etc.; (11) unsaturated dibasic acid anhydrides such as maleic acid anhydride, citraconic acid anhydride, itaconic acid anhydride, alkenylsuccinic acid anhydride, etc.; (12) monoesters of unsaturated dibasic acids such as maleic acid monomethylester, maleic acid monoethylester, maleic acid monobutylester, citraconic acid monomethylester, citraconic acid monoethylester, citraconic acid monobutylester, itaconic acid monomethylester, alkenyl succinic acid monomethylester, fumaric acid monomethylester, methaconic acid monoethylester, etc.; (13) esters of unsaturated dibasic acids such as dimethyl maleate, dimethyl fumarate, etc.; (14) α,β-unsaturated acids such as crotonic acid, cinnamic acid, etc.; (15) α,β-unsaturated acid anhydrides such as crotonic acid anhydride, cinnamic acid anhydride, etc.; (16) carboxyl group containing monomers such as anhydrides between α,β-unsaturated acids as described above and lower fatty acids, alkenyl malonic acids, alkenyl glutaric acids, alkenyl adipic acids, etc., and anhydrides and monoesters of the above acids; (17) acrylic acid or methacrylic acid hydroxyalkyl esters such as 2-hydroxyethyl acrylate, 2-hydroxyethyl methacrylate, 2-hydroxypropyl methacrylate, etc.; and (18) hydroxy group containing monomers such as 4-(1-hydroxy-1-methylbutyl)styrene, 4-(1-hydroxy-1-methylhexyl)styrene, etc.

The vinyl polymers or copolymers to be added, as a binding resin, to a toner of the present invention may have a cross-linked structure which is formed by a crosslinking agent having two or more vinyl groups. Suitable cross-linkers for this purpose may include aromatic divinyl compounds such as divinyl benzene, divinyl naphthalene, etc. Suitable diacrylate compounds linked via an alkyl chain may include, for example, ethyleneglycol diacrylate, 1,3-butyleneglycol diacrylate, 1,4-butanediol diacrylate, 1,5-pentanediol diacrylate, 1,6-hexanediol diacrylate, neopentylglycol diacrylate, etc., and compounds obtained by substituting acrylate of the above compounds for methacrylate.

Suitable dimethacrylate compounds linked via an alkyl chain containing an ether bond may include, for example, diethyleneglycol diacrylate, triethyleneglycol diacrylate, tetraethyleneglycol diacrylate, polyethyleneglycol #400 diacrylate, polyethyleneglycol #600 diacrylate, dipropyleneglycol diacrylate, and compounds obtained by substituting acrylate of the above compounds for methacrylate.

In addition to the compounds cited above, diacrylate or dimethacrylate compounds linked via a chain containing an aromatic group and an ether bond may be employed. Suitable polyester diacrylates may include, for example, a product marketed under the trade name of MANDA (Nippon Kayaku).

Suitable multi-functional cross-linking agents may include pentaerythritol triacrylate, trimethylolethane triacrylate, trimethylolpropane triacrylate, tetramethylolmethane tetraacrylate, oligoester acrylate, and compounds obtained by substituting acrylate of the above compounds for methacrylate, such as triallyl cyanulate, triallyl trimellitate, etc.

The cross-linking agent is preferably added in an amount of 0.01 to 10 parts by mass, particularly 0.03 to 5 parts by mass, per 100 parts by mass of the other monomer. Particularly preferred cross-linking agents may include aromatic divinyl compounds (particularly divinyl benzene), and diacrylate compounds linked via a binding chain containing an aromatic group and an ether bond, because they allow a toner resin to have improved stability and resistance to offsetting. Among those compounds, combination of monomers, which will produce a styrene copolymer or styrene-acryl copolymer is preferred.

Suitable polymerization initiating agents to be used in the manufacture of vinyl polymers or vinyl copolymers in the present invention may include, for example, 2,2'-azobis isobutylonitrile, 2,2'-azobis(4-methoxy-2,4-dimethylvaleronitrile), 2,2'-azobis(2,4-dimethylvaleronitrile), 2,2'-azobis (2-methylbutylonitrile), dimethyl-2,2'-azobisbutylate, 1,1'-azobis(1-cyclohexanecarbonitrile), 2-(carbamoylazo)-isobutylonitrile, 2,2'-azobis(2,4,4-trimethylpentane), 2-phenylazo-2',4'-dimethyl-4'-methoxyvalonitrile, 2,2'-azobis(2-methylpropane), ketone peroxides such as methylethylketone peroxide, acetylacetone peroxide, cyclohexanone peroxide, 2,2-bis(tert-butylperoxy) butane, tert-butyl hydroperoxide, cumene hydroperoxide, 1,1,3,3-tetramethylbutyl hydroperoxide, di-tert-butyl peroxide, tert-butylcumyl peroxide, dicumyl peroxide, α-(tert-butylperoxy)isopropyl benzene, isobutyl peroxide, octanoyl peroxide, decanoyl peroxide, lauroyl peroxide, 3,5,5-trimethylhexanoyl peroxide, benzoyl peroxide, m-tolyl peroxide, di-isopropyl peroxydicarbonate, di-2-ethylhexyl peroxydicarbonate, di-n-propyl peroxydicarbonate, di-2-ethoxyethyl peroxycarbonate, di-ethoxyisopropyl peroxydicarbonate, di(3-methyl-3-methoxybutyl)peroxycarbonate, acetylcyclohexylsulfonyl peroxide, tert-butyl peroxyacetate, tert-butyl peroxyisobutylate, tert-butyl peroxy-2-ethylhexalate, tert-butyl peroxylaurate, tert-butyl-oxybenzoate, tert-butyl peroxyisopropylcarbonate, di-tert-butyl peroxyisophthalate, tert-butyl peroxyallylcarbonate, isoamylperoxy-2-ethylhexanoate, di-tert-butyl peroxyhexahydroterephthalate, tert-butyl peroxyazelate, etc.

When a styrene-acryl resin is employed as a binding resin, the resin having the following feature is preferably used: when the part soluble in tetrahydrofuran (THF) is analyzed by GPC in respect of a molecular weight distribution, there are at least one peak in the range of 3,000 to 50,000 (number average molecular weight), and at least one peak in the range over 100,000, because the toner containing such a resin is excellent in fixation, resistance to off-setting, and stability during storage. Binding resins in which the THF-soluble part whose molecular weight is not more than 100,000 accounts for 50 to 90% are also preferred. Binding resins in which the molecular weight of the THF-soluble part has a main peak in the range of 5,000 to 30,000, much 5,000 to 20,000 are most preferred.

When the binding resin is a vinyl polymer such as styrene-acryl resin, its acid value is preferably in the range of 0.1 to 100 mg KOH/g, more preferably 0.1 to 70 mg KOH/g, still more preferably 0.1 to 50 mg KOH/g.

Suitable monomers to be used for the formation of polyester polymers may include followings. Suitable divalent alcohol components may include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, and diol obtained by subjecting bisphenol A and cyclic ether such as ethylene oxide or propylene oxide to polymerization.

To crosslink a polyester resin, alcohol having a valence equal to or higher than three (3) is preferably used in combination. Such polyhydric alcohols may include sorbitol, 1,2,3,6-hexanetetrol, 1,4-sorbitan, pentaerythritol, dipentaerythritol, tripentaerythritol, 1,2,4-butanetriol, 1,2,5-pentatriol, glycerol, 2-methylpropanetriol, 2-methyl-1,2,4-butanetriol, trimethylol ethane, trimethylol propane, 1,3,5-trihydroxybenzene, etc.

Suitable acid components that form polyester polymers in combination may include benzyldicarbonic acids such as phthalic acid, isophthalic acid, terephthalic acid, etc. and their anhydrides, succinic acid, adipic acid, sebacic acid, alkyldicarboxylic acids such as azelaic acid and their anhydrides, unsaturated dibasic acids such as maleic acid, citraconic acid, itaconic acid, alkenylsuccinic acid, fumaric acid, mesaconic acid, etc., and unsaturated dibasic acid anhydrides such as maleic acid anhydride, citraconic acid anhydride, itaconic acid anhydride, alkenylsuccinic acid anhydride, etc. Suitable polyvalent (equal to or higher than trivalent) carbonic acid components may include trimellitic acid, pyromellitic acid, 1,2,4-benzene tricarboxylic acid, 1,2,5-benzene tricarboxylic acid, 2,5,7-naphthalene tricarboxylic acid, 1,2,4-naphthalene tricarboxylic acid, 1,2,4-butane tricarboxylic acid, 1,2,5-hexane tricarboxylic acid, 1,3-dicarboxy-2-methyl-2-methylenecarboxy propane, tetra(methylenecarboxy)methane, 1,2,7,8-octane tetracarboxylic acid, EnPol trimer acid, etc., and their anhydrides and partial lower alkyl esters.

When a polyester resin is employed as a binding resin, the resin having the following feature is preferably used: when the THF soluble part is analyzed for a molecular weight distribution, there are at least one peak in the range of 3,000 to 50,000, because the toner incorporating such a resin will be excellent in fixation and resistance to off-setting. Binding resins in which the THF-soluble part whose molecular weight is not more than 100,000 accounts for 60 to 100% are also preferred. Binding resins in which the molecular weight of THF-soluble part has a peak in the range of 5,000 to 20,000 are more preferred.

When the binding resin is a polyester polymer, its acid value is preferably in the range of 0.1 to 100 mg KOH/g, more preferably 0.1 to 70 mg KOH/g, still more preferably 0.1 to 50 mg KOH/g.

The molecular weight distribution of the binding resin in the present invention is determined by gel permeation chromatography (GPC) using THF as solvent.

The binding resin to be added to a toner of the invention may include, in addition to a vinyl polymer component and/or a polyester polymer component, a resin containing a monomer component which can react with the above polymer component. Suitable monomer components that constitute a polyester resin component and can polymerize with a vinyl polymer may include, for example, unsaturated dicarboxylic acids such as phthalic acid, maleic acid, citraconic acid, itaconic acid, etc., and their anhydrides. Suitable monomer components that constitute a vinyl polymer component may include, for example, a carboxyl group or a hydroxy group containing compounds, and acrylic acid and methacrylic acid esters.

When a polyester polymer, a vinyl polymer, and another binding resin are used in combination, they are preferably chosen such that binding resins in which the acid value of overall binding resins is in the range of 0.1 to 50 mg KOH/g account for 60 mass % or higher.

In the present invention, the acid value of the binding resin component of a toner composition is determined by the following method whose basic procedures are determined in accordance with JIS K-0070.

(1) A material is deprived in advance of any additives other than a binding resin (polymer components), or the acid values and contents of components other than a binding resin and cross-linked binding resin are determined in advance. A 0.5 to 2.0 g of sample in the form of pulverized powder is precisely weighed, and its weight is represented by W g. For example, for the acid value of a binding resin of a toner to be determined, the acid values and contents of a coloring agent and magnetic body used in combination are determined separately, and the acid value of a binding resin is determined by calculation based on the acid values and contents of the other components.

(2) The sample is transferred to a 300 (ml) beaker, to which is added 150 (ml) of a mixture liquid comprising toluene/ethanol (4/1 v/v) for dissolution.

(3) The resulting solution is titrated with a potentiometer by using an ethanol solution of 0.1 mol/l KOH.

(4) The amount of a KOH solution used is represented by S (ml). The same measurement is also performed on a blank, and the amount of a KOH solution used is represented by B (ml). Then, the acid value in question can be calculated via equation (1) below. In the equation, f represents a factor for KOH.

$$\text{Acid value (mg KOH/g)} = [(S-B) \times f \times 5.61]/W \qquad (1)$$

A binding resin of toner, or a composition containing a binding resin preferably has a glass transition temperature (Tg) in the range of 35 to 80° C., particularly 40 to 75° C. from the viewpoint of storage stability of toner. When Tg is lower than 35° C., the toner would easily degrade when exposed to a high temperature environment, and undergo offsetting during fixation. On the contrary, When Tg exceeds 80° C., the toner's fixation would be degraded.

Suitable magnetic materials to be used in the invention may include (1) magnetic iron oxides such as magnetite, maghemite, ferrite, etc., and iron oxides containing other metal oxides. Or they may include (2) metals such as iron, cobalt, nickel, etc., and alloys of those metals with aluminum, cobalt, copper, lead, magnesium, tin, zinc, antimony, beryllium, bismuth, cadmium, calcium, manganese, selenium, titanium, tungsten, and vanadium. Or they include (3) combinations of those metals and alloys.

Specific magnetic materials may include, for example, $Fe_3O_4$, $\gamma\text{-}Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_3$, iron powder, cobalt powder, nickel powder, etc. One or two or more chosen from the aforementioned magnetic materials may be used in combination. The particularly preferred magnetic material is fine powder of triiron tetraoxide or γ-diiron trioxide.

Magnetic iron oxides such as magnetite, maghemite, ferrite, etc. containing additional different elements and their combinations may be used. Suitable additional elements may include lithium, beryllium, boron, magnesium, aluminum, silicon, phosphorus, germanium, zirconium, tin, sulfur, calcium, scandium, titanium, vanadium, chromium, manganese, cobalt, nickel, copper, zinc, gallium, etc. Preferably, any one chosen from magnesium, aluminum, silicon, phosphor, and zirconium is used. The additional different element may be incorporated into the crystal lattice of iron oxide, added as an oxide to iron oxide, or be present as an oxide or hydroxide on the surface of iron oxide, but it is preferably contained as an oxide.

The additional different element can be incorporated into the particles by making the salt of the additional different element present when the magnetic material is prepared and then controlling the pH. The additional different element can be precipitated on the particle surface by controlling the pH after the generation of the magnetic particles, or by adding the salt of the additional different element and then adjusting the pH.

The amount of a magnetic material used may be 10 to 200 parts by mass, preferably 20 to 150 parts by mass with respect to 100 parts by mass of the binding resin. The magnetic material in the powder form has a number average particle diameter of 0.1 to 2 µm, preferably 0.1 to 0.5 µm. The average particle diameter of a given powder can be obtained by taking an enlarged picture of the powder by transmission electron microscopy, and by determining the diameter of individual particles in the picture with a digitizer.

The magnetic material, when exposed to a magnetic field of 10 K oersted, preferably exhibits a counter magnetic force of 20 to 150 oersted, saturation magnetization of 50 to 200 emu/g, and residual magnetization of 2 to 20 emu/g.

The magnetic material may also be used as a coloring agent. To produce a black toner, suitable coloring agents to be used in accordance with the present invention may include black or blue dyes and pigment particles. Suitable black or blue pigments may include carbon black, aniline black, acetylene black, phthalocyanine blue, indanthrene blue, etc. Suitable black or blue dyes may include azo dyes, anthraquinone dyes, xanthene dyes, methine dyes, etc.

Suitable coloring agents to be added to color toner may include followings.

Suitable magenta coloring agents may include condensed azo compounds, diketopyrrolopyrrole compounds, anthraquinone compounds, quinacridone compounds, basic dyes, lake dyes, naphthol dyes, benzimidazolone compounds, thioindigo compounds, perylene compounds, etc. Specifically, suitable magenta coloring dyes may include C.I. pigment red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 202, 206, 207, 209, C.I. pigment violet 19, C.I. bat red 1, 2, 10, 13, 15, 23, 29, 35, etc.

The aforementioned pigments may be used alone, but combination of a dye(s) and pigment(s) is more preferable because then the quality of full color images is improved.

Suitable dye-class magenta pigments may include oil soluble dyes such as C.I. sorbent red 1, 3, 8, 23, 24, 25, 27, 30, 49, 81, 82, 83, 84, 100, 109, 121, and C.I. disperse red 9, C.I. sorbent violet 8, 13, 14, 21, 27, and C.I. disperse violet 1, etc., and basic dyes such as C.I. basic red 1, 2, 9, 12, 13, 14, 15, 17, 18, 22, 23, 24, 27, 29, 32, 34, 35, 36, 37, 38, 39, 40, C.I. basic violet 1, 3, 7, 10, 14, 15, 21, 25, 26, 27, 28, etc.

As a cyan coloring agent, copper phthalocyanin compounds and their derivatives, anthraquinone, and basic dye lake compounds may be employed. To put it specifically, suitable cyan coloring agents may include C.I. pigment blue 2, 3, 15, 16, 17, C.I. bat blue 6, C.I. acid blue 45, and copper phthalocyanin pigments wherein 1 to 5 phthalimidemethyl groups of phthalocyanin skeleton are substituted.

Suitable yellow coloring agents may include condensed azo compounds, isoindolinone compounds, anthraquinone compounds, azo metal complexes, methine compounds and allylamide compounds. To put it specifically, suitable yellow compounds may include C.I. pigment yellow 1, 2, 3, 4, 5, 6, 7, 10, 11, 12, 13, 14, 15, 16, 17, 23, 65, 73, 83, C.I. bat yellow 1, 3, 20, etc.

The aforementioned coloring agent is preferably used in an amount of 0.1 to 20 parts by mass per 100 parts by mass of the binding resin.

The toner of the present invention may be a two-component developing agent in combination with a carrier. Suitable carriers to be used according to the present invention may include common carriers such as ferrite, magnetite, etc., and resin-coated carriers.

The resin-coated carrier is composed of carrier core particles and a coating material or a resin for coating the surface of carrier core particles. Suitable resins to be used as a coating material may include styrene-acryl resins such as styrene-acrylic acid ester copolymers, styrene-methacrylic acid ester copolymers, etc., acrylic acid resins such as acrylic acid ester copolymers, methacrylic acid ester copolymers, etc., fluorine-containing resins such as polytetrafluoroethylene, monochlorotrifluoroethylene polymer, polyvinylidene fluoride, etc., silicone resins, polyester resins, polyamide resins, polyvinylbutyral, aminoacrylate resins, etc. Besides them, any resin may be used as long as it can be used as a coating material of resins such as ionomer resin, polyphenylene-sulfide resin, etc. They may be used alone, or two or more of them may be used in combination.

Binder type carrier cores obtained by dispersing magnetic powder in a resin may be used.

Coating the surface of carrier core particles with a resin coating material may be made by dissolving or dispersing a resin in a solvent, and using the resulting solution to coat the carrier core particles, or by admixing carrier core particles to powdery coating material. The amount of resin coating material relative to that of resin-coated carrier may be determined as appropriate, but is preferably 0.01 to 5 mass %, more preferably 0.1 to 1 mass %.

When a coating material comprising two or more materials is used for coating magnetic body, following illustrative examples may serve as reference: (1) 12 parts by mass of a mixture of dimethylchlorosilane and dimethylsilicone oil (1:5 w/w) is applied to 100 parts by mass of titanium oxide in fine powder form to coat the latter, and (2) 20 parts by mass of a mixture of dimethyldichlorosilane and dimethylsilicone oil (1:5 w/w) is applied to 100 parts by mass of silica in fine powder form to coat the latter.

Mixtures of styrene-methacrylic acid methyl copolymer, mixtures of fluorine-containing resin and styrene copolymer, or mixtures of silicone resins out of aforementioned resins are preferably used, particularly mixtures of silicone resins are preferably used.

Suitable mixtures comprising fluorine-containing resin and styrene copolymer may include, for example, mixtures of polyvinylidene fluoride and styrene-methyl methacrylate copolymer, mixtures of polytetrafluoroethylene and styrene-methyl methacrylate copolymer, mixtures of vinylidene fluoride-tetrafluoroethylene copolymer (10:90-90:10 mass ratio), styrene-2-ethylhexyl acrylate copolymer (10:90-90:10 mass ratio) and styrene-2-ethylhexyl acrylate-methyl methacrylate copolymer ((20-60):(5-30):(10-50) mass ratio).

Suitable silicone resins may include nitrogen-containing silicone resin, modified silicone resin obtained by reacting nitrogen-containing silane coupling agent with silicone resin, etc.

Suitable magnetic materials to form carrier cores may include oxides such as ferrite, excess iron type ferrite, magnetite, γ-iron oxide, etc., metals such as iron, cobalt, nickel, etc., and alloys of those metals. Suitable elements contained in the magnetic material may include iron, cobalt, nickel, aluminum, copper, lead, magnesium, tin, zinc, antimony, beryllium, bismuth, calcium, manganese, selenium, titanium, tungsten, vanadium, etc. Suitable magnetic materials may include copper-zinc-iron ferrite comprising, as main ingredients, copper, zinc and iron, and manganese-magnesium-iron ferrite comprising, as main ingredients, manganese, magnesium and iron.

The resistance of carriers is preferably made equal to one million to ten billion Ω·cm, by adjusting the surface roughness of carrier or the amount of a coating resin applied thereto. The carriers may have a particle diameter in the range of 4 to 200 μm, preferably 10 to 150 μm, more preferably 20 to 100 μm. Particularly, the 50% particle diameter of the coated carriers is preferably in the range of 20 to 70 μm.

The two-component developers preferably contain 1 to 200, more preferably 2 to 50 parts by mass of toner of the present invention per 100 parts by mass of the carrier.

The toner of the present invention may further contain wax. Suitable waxes to be used in accordance with the present invention may include followings: low molecular weight polyethylene, low molecular weight polypropylene, and aliphatic hydrocarbon waxes such as polyolefin wax, microcrystalline wax, paraffin wax, Sasol wax, etc. Oxidized aliphatic hydrocarbon waxes such as oxidized polyethylene waxes and their block copolymers may also be used. Plant waxes such as candelilla wax, carnauba wax, sumac wax, jojoba wax, etc., animal waxes such as bees wax, lanolin, whale wax, etc., mineral waxes such as ozokerite, cerecine, petrolatum, etc., waxes mainly composed of aliphatic esters such as montanic acid ester wax, caster wax, etc., and waxes obtained by totally or partially deoxidizing fatty acid esters such as deoxidized carnauba wax may also be used.

Suitable waxes may further include saturated straight chain fatty acids such as palmitic acid, stearic acid, montanic acid, and straight chain alkyl carboxylic acids having straight chain alkyl group, unsaturated fatty acids such as prandinic acid, eleostearic acid, valinaphosphoric acid, etc., saturated alcohols such as stearyl alcohol, eicosyl alcohol, behenyl alcohol, carnaupyl alcohol, ceryl alcohol, mesilyl alcohol, long straight chain alkyl alcohol, etc., polyhydric alcohols such as sorbitol, fatty acid amides such as linoleic acid amide, olefinic acid amide, lauric acid amide, etc., saturated fatty acid amides such as methylenebiscapric acid amide, ethylenebislauric acid amide, hexamethylenebisstearic acid amide, etc., unsaturated fatty acid amides such as ethylenebisolefinic acid amide, hexamethylenebisolefinic acid amide, N,N'-dioleyladipic acid amide, N,N'-dioleylsebacic acid amide, aromatic bis amides such as m-xylenebisstearic acid amide, N,N-distearylisophthalic acid amide, metal salts of fatty acid such as calcium stearate, calcium laurate, zinc stearate, magnesium stearate, etc., waxes obtained by grafting vinyl monomers such as styrene or acrylic acid to aliphatic hydrocarbon waxes, partial ester compounds obtained via reaction of fatty acids such as monoglyceride behenate with polyhydric alcohol, and methyl ester compounds comprising a hydroxyl group obtained by hydrogenating plant oil and fat.

Suitable waxes may include polyolefins obtained by subjecting olefin to radical polymerization under high pressure, polyolefin obtained by purifying low molecular weight byproducts generated during the synthesis of high molecular weight polymers, polyolefin obtained via polymerization in the presence of Ziegler or metallocene catalyst under low pressure, polyolefin obtained via polymerization excited by radioactive ray, electromagnetic ray or light, low molecular weight polyolefin obtained by thermally decomposing high molecular weight polyolefin, paraffin wax, microcrystalline wax, Fischer-Tropsch wax using, synthetic hydrocarbon waxes obtained via synthesis by syntol, hydrochol, or aege method, synthetic waxes comprising a monomer having a single carbon atom, hydrocarbon waxes having a functional group such as hydroxyl or carboxyl group, mixtures comprising hydrocarbon wax and functional group-containing hydrocarbon wax, and waxes obtained by graft-modifying these waxes with vinyl monomers such as styrene, maleic acid ester, acrylate, methacrylate, or maleic acid anhydride.

Suitable waxes may further include waxes to which press condensation, solvent dissolution, recrystallization, reduced pressure distillation, super-critical gas extraction, or solution crystallization was applied to modify them such that the distribution of molecular weights has a sharpened peak, or such that low molecular weight solid fatty acids, low molecular weight solid alcohols, and other low molecular weight solid compounds were removed.

The wax to be used in accordance with the present invention preferably has a melting point in the range of 70 to 140° C., more preferably 70 to 120° C., because then fixation and resistance to offsetting are well balanced. If the melting point were below 70° C., resistance to blocking would be impaired, whereas if the melting point were over 140° C., resistance to offsetting would be hardly manifest.

It is possible by using two or more different waxes in combination to exploit both the plasticity and releasability characteristic with wax.

The waxes having a plastic property include, for example, waxes having a low melting point, or waxes whose molecular structure has a bifurcation point or polar group. The waxes having a releasing property include, for example, waxes having a high melting point, waxes, which has a straight chain structure, or waxes whose structure has no functional group or has a non-polar group. Suitable combination of two or more waxes may include the combination of two or more waxes in which the difference in melting point is 10 to 100° C., and combination of polyolefin and graft-modified polyolefin.

When two kinds of waxes, which have a similar structure are used in combination, the one having a lower melting point is responsible for the plasticity of the compound, while the other having a higher melting point is responsible for the die-separation of the compound. If the two waxes have melting points different by 10 to 100° C., allotment of the functions to the two waxes will be successfully achieved. If the difference between the two melting points were below 10° C., the functions allotted to the two kinds of waxes would be hardly separate from each other. On the contrary, if the difference in question were over 100° C., the functions allotted to the two waxes would be so remarkable that interaction effects would be hardly manifest. In this case, one of the two kinds of waxes preferably has a melting point in the range of 70 to 120° C., more preferably 70 to 100° C., because then it will be possible for the two kinds of waxes to exhibit their characteristic features more manifestly.

Waxes whose structure has a bifurcating point or a polar group such as a functional group, or is modified to have a component different from a principal component tend to be more plastic, while waxes whose structure takes a straight chain form, has no polar group but has a non-polar group, or undergoes no modification tend to be released more readily from the die. Suitable combinations of two kinds of waxes may include the combination of polyethylene homopolymer or copolymer mainly composed of ethylene with polyolefin homopolymer or copolymer mainly composed of olefin excluding ethylene; combination of polyolefin and graft-modified polyolefin; combination of alcohol wax, fatty acid wax, or ester wax and hydrocarbon wax; combination of Fischer-Tropsch wax or polyolefin wax with paraffin wax or microcrystalline wax; combination of Fischer-Tropsch wax with polyolefin wax; combination of paraffin wax with microcrystalline wax; and combination of carnauba wax, candelilla wax, rice wax, or montan wax with hydrocarbon wax.

In any combination, it is preferable that a suitable compound wax, in the endothermic curve obtained by DSC measurement, preferably has a maximum peak in the range of 70 to 120° C., more preferably 70 to 110° C. If this condition is satisfied, balance between toner-stability and fixation will be more easily achieved.

The amount of the wax to be added to the present toner is preferably 0.2 to 20 parts by mass, more preferably 0.5 to 10 parts by mass per 100 parts by mass of the binding resin.

According to the present invention, the melting points of waxes are determined to be a peak-top temperature of the maximum peak in the endothermic curve obtained by DSC measurement.

According to the present invention, the DSC measurement of waxes or toners is preferably performed using an internal combustion type input-compensated differential scanning calorimeter. Measurement should be performed in accordance with ASTM D3418-82. The DSC curve used in the present invention is obtained by performing once a cycle of heating and cooling to obtain hysteresis and then raising temperature at a rate of 10° C./min.

To the present toner may be added a fluidity enhancing agent. The toner fluidity enhancing agent, when added to the surface of the toner, improves the fluidity (smoothens the flow) of the toner. Suitable fluidity enhancing agents may include, for example, carbon black, fluorine resin powders such as vinylidene fluoride powder, polytetrafluoroethylene fine powder, etc., silica fine powder such as silica prepared by wet method, silica prepared by dry method, etc., titanium oxide fine powder, alumina fine powders, silica treated with silane coupling agent, titanium coupling agent, or silicon oil, similarly treated titanium oxide and alumina, etc. Of them, silica fine powder, titanium oxide fine powder, and alumina fine powder are particularly preferred, and silica obtained by treating the surface of aforementioned powder with silane coupling agents or silicone oils is more preferable. The powdery fluidity enhancing agents preferably have an average primary diameter in the range of 0.001 to 2 μm, particularly 0.002 to 0.2 μm.

Preferred silica fine powder may include fine powder obtained by subjecting silicon halide compounds to gaseous oxidation, and silica obtained by dry method or so-called fumed silica.

Suitable commercial silica fine powder obtained by subjecting silicon halide compound to gaseous oxidation may include AEROSIL-130, -300, -380, -TT600, -MOX170, -MOX80 (products of Nippon Aerosil), -COK84:Ca-O-SiL (product of CABOT), -M-5, -MS-7, -MS-75, -HS-5, -EH-5, Wacker HDK (products of WACKER-CHEMIEGMBH), -N20 V15, -N20E, -T30, -T40:D-GFineSilica (products of Dow Corning), and Fransol (product of Fransil).

Hydrophobic silica fine powder is more preferred which is obtained by making hydrophobic silica fine powder which has been obtained by subjecting silicon halide compounds to gaseous oxidation. Particularly preferred is hydrophobic silica fine powder whose hydrophobic activity is, when measured by methanol titration, 30 to 80%. Making silica fine powder hydrophobic is achieved by treating chemically or physically the silica powder with an organic silicon compound capable of reacting with or being adsorbed to the silica powder. A suitable method comprises treating, with an organic silicon compound, silica fine powder obtained by subjecting a silicon halide compound to gaseous oxidation.

Suitable organic silicon compounds for the purpose may include hydroxypropyl trimethoxysilane, phenyl trimethoxysilane, n-hexadecyl trimethoxysilane, n-octadecyl trimethoxysilane, vinyl methoxysilane, vinyl triethoxysilane, vinyl triacetoxysilane, dimethylvinylchlorosilane, divinylchlorosilane, γ-methacryloxy propyl trimethoxysilane, hexamethyldisilane, trimethylsilane, trimethylchlorosilane, dimethyldichlorosilane, methyltrichlorosilane, allyldimethyl chlorosilane, allylphenyl dichlorosilane, benzyl dimethylchlorosilane, bromomethyl dimethylchlorosilane, α-chlorethyl trichlorosilane, β-chloroethyl trichlorosilane, chlorodimethyl chlorosilane, triorganosilyl mercaptan, trimethylsilyl mercaptan, triorganosilyl acrylate, vinyldimethyl acetoxysilane, dimethyl ethoxysilane, trimethyl ethoxysilane, trimethyl methoxysilane, methyl triethoxysilane, isobutyl trimethoxysilane, dimethyl methoxysilane, diphenyl diethoxysilane, hexamethyl dicyloxane, 1,3-divinyltetramethyl disiloxane, 1,3-diphenyl tetramethyldisiloxane, and dimethyl polysiloxane which has 2 to 12 siloxane units per one molecule and 0 to 1 hydroxyl group bound to the Si group located at the terminal position. In addition, silicon oils such as dimethylsilicone oil may be cited. These compounds may be used alone, or two or more of them may be used in combination.

The powdery fluidity enhancing agents preferably have a number average particle diameter in the range of 5 to 100 nm, more preferably 5 to 50 nm. The powdery fluidity enhancing agents preferably have a specific surface area of 30 $m^2/g$ or higher, more preferably 40 to 300 $m^2/g$, when the specific surface area is determined by BET method based on nitrogen adsorption. When the agents exist as fine particles whose surface is treated, it preferably has a specific surface area not less than 20 $m^2/g$, particularly in the range of 40 to 300 $m^2/g$. The amount of the powdery fluidity enhancing agents to be used is preferably 0.3 to 8 parts by mass per 100 parts by mass of the toner particles.

To the present toner may be further added one chosen from various metal soaps, fluorine-based surfactants, or dioctylphthalates for the protection of photosensitive body/carrier, improvement of cleaning amenability, adjustment of thermal, electrical and physical properties, adjustment of resistance, adjustment of softening point, and improvement of fixation, and powdery inorganic substances such as tin oxide, zinc oxide, carbon black, antimony oxide, titanium oxide, aluminum oxide, alumina, etc., for the improvement of electric conductivity. The powdery inorganic substances may be made hydrophobic as needed. To the toner may be further added lubricating agents such as polytetrafluoroethylene, zinc stearate, polyvinylidenefluoride, etc., abrasion agents such as cesium oxide, silicon carbide, strontium titanate, etc., caking blocking agents, and development enhancing agents represented by white or black fine particles having an opposite polarity to that of the toner particles.

These additives are preferably treated with a treating agent chosen from silicon varnish, various modified silicone varnishes, silicone oil, various modified silicone oils, silane coupling agents, silane coupling agents having functional group, other organic silicon compound-based treatment agents, and other treatment agents.

It is possible to obtain a desired toner for electrostatic development by putting a toner together with additives as described above into a mixer such as Henschel mixer, ball mill, Nauta mixer, V-type mixer, W-type mixer, super mixer, etc., to thoroughly knead the mixture, and treating the surface of toner particles with a coating material.

The present toner is thermally stable, will not undergo thermal change during electrophotographic process, and will be able to stably hold charging property. Since the charge controlling agent can be dispersed uniformly in a binding resin, regardless of the type of binding resin, a charge distribution in a fresh toner is very uniform. Therefore, even part of a toner that is not transferred, or part that is recovered (discarded toner) has the same saturation level of charge and charge distribution as in a fresh toner. If used remains of the toner of the present invention for electrostatic development are recovered for reuse, it is possible to further narrow the difference between a fresh toner and a recycled toner by selecting, as a binding resin, a polyester resin containing an aliphatic diol, or styrene-acryl copolymer crosslinked with metal, adding an ample amount of polyolefin thereto, and treating the mixture in the aforementioned manner to produce a toner.

The present toner can be prepared by any known method. A preferred exemplary method (pulverization method) comprises transferring toner constituents as described above such as a binding resin, charge controlling agent, coloring agent, etc., into a mixer such as ball mill and thoroughly kneading the mixture. The mixture is transferred to a heater-based kneader such as heat roll kneader to be thoroughly kneaded, and the mixture is cooled to be solidified, pulverized, and sieved.

An alternative method comprises dissolving toner constituents in a solvent, spraying the solution into fine particles, and drying and sieving the particles. Yet another method (polymerization method) comprises admixing, to a monomer, which will serve as a binding resin, other constituents, kneading the mixture, preparing an emulsion or suspension therefrom, and allowing the monomer therein to polymerize to produce a toner. Yet another method for producing a so-called microcapsule toner, that is, toner consisting of particles each constituted of a core material and a shell material comprises admixing other constituents to the core or shell material separately, or both the core and shell materials simultaneously so that specified amounts of other constituents are added to the core and shell materials. Yet another method for producing the present toner comprises adding toner particles together with other additives as needed to a mixer such as Henschel mixer, and thoroughly kneading the mixture.

The pulverization method for producing the present toner will be further detailed below. First, a binding resin and coloring agent, charge controlling agent, and other necessary additives are mixed to uniformity. The materials may be mixed using a known mixer such as Henschel mixer, super mixer, ball mill, or the like. The resulting mixture is kneaded under heating with a closed kneader, or a single or dual screw extruder. The kneaded mass is cooled, and crushed to coarse pieces with a crusher or hammer mill, and the pieces are further pulverized with a jet mill or high speed rotary mill into fine powder. The powder is screened with a wind blow sorter, for example, an elbow-jet sorter for classifying particles according to their inertia using Coanda effect, microplex based on cyclon (centrifugation) classification, or DS separator, etc., until powder having a specified particle size is obtained. For the surface of toner particles to be coated with a coating material, the toner particles together with the coating material are transferred to a high speed stirrer such as Henschel mixer, super mixer, etc., where the materials are mixed by stirring.

Alternatively, the present toner can be prepared by suspension or emulsion polymerization. Suspension polymerization comprises dissolving or dispersing in a solvent evenly a polymerizable monomer, colorant, polymerization initiator, charge controller, a cross-linker as needed, and other necessary additives, to form a monomer composition in suspension or emulsion, and dispersing the monomer composition, by mixing the suspension or emulsion in continuous phase or in water when water is the solvent with a stirrer or disperser such as homo mixer, homogenizer, atomizer, micro-fluidizer, liquid/liquid fluid nozzle, gas/liquid fluid nozzle, electric emulsifier, etc. Preferably, the speed of stirring, its temperature and duration are adjusted such that droplets of polymerizable monomer composition have a size equal to that of desired toner particles. Then, polymerization reaction is allowed to occur at 40 to 90° C., and it is possible to obtain toner particles having a desired size. The toner particles are washed, filtered, and dried. Additives can be incorporated into the toner particles by a method as described above.

A toner produced by emulsion polymerization has an average particle diameter of 0.1 to 1.0 μm which is far smaller than that of a comparative toner produced by suspension polymerization, although the former comprises more uniform particles than the latter. Depending on a given case, it is possible to employ seed polymerization in which smaller emulsion particles are used as nuclei, and a polymerizable monomer is added later to the nuclei to allow the latter to grow. Alternatively, emulsion particles may be fused with each other to form clusters having a desired average diameter.

The polymerization method for the production of toner is advantageous in that it is relieved of the pulverization step which will make toner particles susceptible to mechanical impact, and that, in contrast with conventional methods, it allows the mass production of toners having a low softening point which will widen the selection range of toner materials. In addition, with regard to a toner produced by the method, attachment of a hydrophobic releasing agent or coloring agent to the surface of particles is avoided so effectively that soiling of a toner carrying member, photosensitive body, image-transfer roller, and fixation unit can be minimized.

The polymerization method makes it possible to produce comparatively easily a toner which consists of particles having a small particle diameter and a sharp peak in the size distribution which enables the faithful reproduction of image, transference of image, representation of original color, that is, reproduction of a fine dot image.

Polymerizable monomers suitably used for producing the present toner may include polymerizable vinyl monomers capable of radical polymerization. Suitable polymerizable vinyl monomers may include single functional group-containing polymerizable monomers and multiple functional group-containing polymerizable monomers.

Suitable single functional group-containing monomers may include styrene type polymerizable monomers such as styrene, α-methylstyrene, β-methylstyrene, o-methylstyrene, m-methylstyrene, p-methylstyrene, p-methylstyrene, 2,4-dimethylstyrene, p-n-butylstyrene, p-tert-butylstyrene, p-n-hexylstyrene, p-phenylstyrene, etc.; acryl type polymerizable monomers such as methyl acrylate, ethyl acrylate, n-propyl acrylate, isopropyl acrylate, n-butyl acrylate, isobutyl acrylate, tert-butyl acrylate, n-amyl acrylate, n-hexyl acrylate, 2-ethylhexyl acrylate, n-octyl acrylate, benzyl acrylate, dimethylphosphate methylacrylate, dibutylphosphate ethylacrylate, 2-benzoyloxy ethylacrylate, etc.; methacryl type polymerizable monomers such as methyl methacrylate, ethyl methacrylate, n-propyl methacrylate, isopropyl methacrylate, n-butyl methacrylate, isobutyl methacrylate, tert-butyl methacrylate, n-amyl methacrylate, n-hexyl methacrylate, 2-ethylhexyl methacrylate, n-octyl methacrylate, diethylphosphate methacrylate, dibutylphosphate methacrylate, etc.; unsaturated fatty acid monocarboxylic acid esters; vinyl esters such as vinyl acetate, vinyl propionate, vinyl benzoate, etc.; vinyl ethers such as vinyl methyl ether, vinyl isobutyl ether, etc.; and vinyl ketones such as vinyl methyl ketone, vinyl hexyl ketone, methyl isopropyl ketone, etc.

Suitable multifunctional polymerizable monomers may include diethyleneglycol diacrylate, triethyleneglycol diacrylate, tetraethyleneglycol diacrylate, polyethyleneglycol diacrylate, 1,6-hexanediol diacrylate, neopentylglycol diacrylate, tripropyleneglycol diacrylate, polypropyleneglycol diacrylate, 2,2-bis[4-(acryloxy-diethoxy)phenyl]propane, trimethylol propane triacrylate, tetramethylolmethane tetraacrylate, ethyleneglycol dimethacrylate, triethyleneglycol methacrylate, tetraethyleneglycol dimethacrylate, polyethyleneglycol methacrylate, 1,3-butyleneglycol dimethacrylate, 1,6-hexanediol dimethacrylate, neopentylglycol methacrylate, polypropyleneglycol dimethacrylate, 2,2-bis[4-(methacryloxy-diethoxy)phenyl]propane, 2,2-bis[4-(methacryloxy-polyethoxy)phenyl]propane, trimethylolpropane trimethacrylate, tetramethylolmethane tetramethacrylate, divinyl benzene, divinyl naphtalene, divinyl ether, etc.

According to the present invention, one or two or more chosen from the above uni-functional polymerizable monomers may be used in combination, or one chosen from the above uni-functional polymerizable monomers and one chosen from the above multi-functional monomers may be used in combination. The multifunctional polymerizable monomers may also be used as a cross-linking agent. Suitable initiating agents for initiating the polymerization of polymerizable monomers as described above may include fat-soluble and/or water-soluble initiating agents. Suitable fat-soluble initiating agents may include, for example, azo compounds such as 2,2'-azobisbutylnitorile, 2,2'-azobis-2,4-dimethylvaleronitrile), 1,1'-azobis(cyclohexane-1-carbonitrile), 2,2'-azobis-4-methoxy-2,4-dimethylvaleronitrile, etc.; and peroxide initiating agents such as acetylcyclohexylsurfonyl peroxide, diisopropyl peroxycarbonate, decanonyl peroxycarbonate, decanonyl peroxide propionyl peroxide, acetyl peroxide, tert-butylperoxy-2-ethyl hexanoate, benzoyl peroxide, tert-butyl peroxyisobutylate, cyclohexanon peroxide, methylethylketone peroxide, tert-butyl peroxide, di-tert-butyl peroxide, cumene hydroperoxide, etc.

Suitable water-soluble initiating agents may include ammonium persulfate, potassium persulfate, 2,2'-azobis(N, N'-dimethyleneisobutyloamidin)hydrochloride, 2,2'-azobis (2-aminodipropane)hydrochloride, azobis(isobutylamidin) hydrochloride, 2,2'-azobisisobutylonitrile sodium sulfonate, ferrous sulfate, and hydrogen peroxide.

The polymerization initiating agents are preferably added in an amount of 0.5 to 20 parts by mass per 100 parts by mass of the polymerizable monomer, and any one chosen from the above initiators may be used alone or two or more may be used in combination.

Dispersing agents suitably used during the production of a polymerization toner may include, for example, inorganic oxides such as calcium triphosphate, magnesium phosphate, aluminum phosphate, zinc phosphate, calcium carbonate, magnesium carbonate, aluminum hydroxide, calcium metasilicate, calcium sulfate, barium sulfate, bentonite, silica, alumina, etc. organic compounds suitably used as a dispersing agents may include, for example, polyvinyl alcohol, gelatin, methyl cellulose, methylhydroxypropyl cellulose, ethyl. cellulose, sodium salt of caroboxymethyl cellulose, starch, etc. The dispersing agent is preferably used in an amount of 0.2 to 2.0 parts by mass with respect to 100 parts by mass of polymerizable monomer.

Commercially available dispersing agents may be used neat, but the dispersing agents may be stirred in a dispersing solvent at a high speed so that an inorganic compound which consists of fine particles having a uniform particle size can be obtained.

A toner obtained by the polymerization method consists of particles whose degree of roughness tends to be small, as compared with a toner obtained by the pulverization method. However, the individual particles of the toner are modified to have an irregular contour so that their contact with an electrostatic latent image carrying body is enhanced. As a consequence, soiling of the interior of the machine is more effectively avoided, and acquisition of higher density and higher quality images is more readily achieved.

Production of a toner by pulverization may be attained by a water bath method in which toner particles are dispersed in water and heated, by a thermal treatment method in which toner particles are allowed to pass through hot air jet, or by a mechanical impact method in which mechanical energy is applied to toner particles for reducing the surface roughness of the particles. Apparatuses suitably used for reducing the surface roughness of toner particles may include a mechanofusion system (Hosokawa-Micro) based on dry mechanochemical treatment, I type jet mill, hybridizer (Nara Manufacturing Co.) or a mixer comprising rotor and liner, and Henschel mixer or a mixer comprising a high speed agitation propeller.

The surface roughness of the toner particles may be represented by the average roundness of the particles. To determine the average roundness (C) of a given group of toner particles, the roundness value (Ci) of each particle is determined according to equation (2) below, and then the average roundness (C) is obtained, as shown in equation (3) below, by dividing the summed roundness values with the total number (m) of particles.

Roundness (Ci)=(circumferential length of a circle having the same projection area of particle)/ (circumferential length of the projected image of particle)    (2)

Average Roundness $$C = \sum_{i=1}^{m} \frac{Ci}{m} \tag{3}$$

The above roundness (Ci) may be determined using a flow particle image analysis system (for example, FPIA-1000 provided by Toa Medical Electronics). Determination of the roundness of a population of particles may comprise dispersing about 5 mg of toner in 10 ml of water to which about 0.1 mg of a nonionic surfactant has been dissolved to produce a suspension, exposing the suspension to ultrasonic wave (20 kHz, 50 W) for 5 minutes, adjusting the concentration of the suspension such that it contains 5000 to 20000 particles/μl, and subjecting the suspension to the measurement with the flow particle analysis system to obtain the distribution curve of particles having a diameter in the range of 0.60 µm or higher to less than 159.21 µm.

Toner particles are preferably adjusted such that their average roundness value falls in the range of 0.955 to 0.990, more preferably 0.960 to 0.985. Then, it is possible to minimize the amount of toner particles left without being transferred, or particles undergoing renewed transference.

Th present toner preferably has an average particle diameter (volume basis) in the range of 2 to 15 µm, more preferably 3 to 12 µm when determined, for example, with a laser type particle size distribution meter such as a micron sizer (for example, one provided by Seishin Co.), in view of faithful reproduction of image and cost-effective production. When the toner consists of particles having an average particle diameter larger than 15 µm, the resolution and sharpness of images will be apt to be degraded. On the contrary, when the toner particles have an average diameter below 2 µm, the resolution in image could be improved, but the following problems are apt to be seen: the yield of toner production would be lowered, leading to high production cost, toner is spread in the internal space of the machine, and toner is adhered to the skin of user, leading to adverse effects on his/her health.

The present toner preferably has the distribution of particles as follows when measured with a Coulter counter (TA-II, Coulter): the number of particles whose size is not more than 2 µm (particle number basis) is 10 to 90%, while the number of particles whose size is not less than 12.7 µm (volume basis) is 0 to 30%.

The present charge controlling agent preferably has a specific surface area in the range of 1.2 to 5.0 m²/g, more preferably 1.5 to 3.0 m²/g, when the specific surface area is determined by BET method based on nitrogen adsorption. The specific surface area of particles is defined as follows: using a BET specific surface area measuring device (for example, FlowSorb II2300, Shimadzu), nitrogen gas adsorbed to the surface of particles is released at 50° C. for 30 minutes, the nitrogen gas is rapidly cooled with liquid nitrogen so that the nitrogen gas is readsorbed to the particles, the particles are heated again to 50° C. to release nitrogen, and the specific surface area is determined based on the volume of released nitrogen.

The apparent specific gravity (bulk density) of the present toner is determined using, for example, a powder tester (for example, one provided by Hosokawa Micron). The apparent specific gravity of non-magnetic toner preferably is in the range of 0.2 to 0.6 g/cm³, while the apparent specific gravity of magnetic toner preferably is in the range of 0.2 to 2.0 g/cm³, although the apparent specific gravity may vary depending on the type and content of magnetic powder of the toner.

The true specific gravity of non-magnetic toner preferably is in the range of 0.9 to 1.2 g/cm³, while the true specific gravity of magnetic toner preferably is in the range of 0.9 to 4.0 g/cm³, although the true specific gravity may vary depending on the type and content of magnetic powder of the toner. The true specific gravity of given toner particles can be determined as follows. A 1.000 g of toner is precisely weighed, the toner is transferred to a tablet molder having a diameter of 10 mmφ, and the toner is compressed in vacuo under the pressure of 20 MPa (200 kgf/cm²) to be press-molded. The resulting cylindrical molded product has its height measured with a micrometer, and the true specific gravity of the toner is determined based on the measurement.

The fluidity of toner is represented by the dynamic resting angle and static resting angle both of which may be determined, for example, with a resting angle meter (for example, one provided by Tsutsui Scientific Co.). The present toner for electrostatic development incorporating a charge controlling agent preferably has a dynamic resting angle in the range of 5 to 45 degree, and static resting angle in the range of 10 to 50 degree.

The present toner preferably has, when it is produced by the pulverization method, an average shape factor (SF-1) of 100 to 400, and average shape factor 2 (SF-2) of 100 to 350.

The shape factors SF-1 and SF-2 of the present toner may be determined as follows. The toner particles are observed with an optical microscope equipped with a CCD camera (for example, BH-2 by Olympus) under 1000× magnification, such that about 30 particles come into view in one frame, the picture is transferred to an image analysis unit (for example, Luzex FS by Nireco), the same procedure is repeated until about 1,000 particles are measured, and the shape factor of the particles is determined based on the measurement. The shape factors (SF-1) and (SF-2) are determined based on the following equations.

$$(SF\text{-}1) = ((ML^2 \times \pi)/4A) \times 100$$

(where ML represents the maximum length of one particle, and A the projected area of one particle).

$$(SF\text{-}2) = ((PM^2)/4A\pi) \times 100$$

(where PM represents the circumferential length of one particle, and A the projected area of one particle).

SF-1 represents the deformation of particles: particles whose SF-1 is close to 100 have a shape nearer to a circle, while particles whose SF-1 is large have a more slender form. SF-2 represents the surface roughness of particles: particles whose SF-2 is close to 100 have a smoother contour, while particles whose SF-2 is large have a more irregular contour.

The present toner preferably has, when it is a non-magnetic toner, a volume resistivity of one trillion to 10,000 trillion Ω·cm, and when it is a magnetic toner, a volume sensitivity of 100 million to 10,000 trillion Ω·cm, although the volume resistivity may vary depending on the type and content of magnetic powder of the toner. The volume resistivity of given toner particles is defined as follows. Toner particles are molded by compression into a disc having a diameter of 50 mm and a thickness of 2 mm, to which are applied solid electrodes (for example, SE-70 by Ando Electric), and a high input impedance meter (for example, 4339A by Hewlet-Puckard) is used to determine the resistance of disc 1 hour after the continuous application of 100V DC voltage.

The present toner preferably has, when it is a non-magnetic toner, a dielectric dissipation of $1.0 \times (1/1000)$ to $15.0 \times (1/1000)$, and when it is a magnetic toner, a dielectric dissipation of $2 \times (1/1000)$ to $30 \times (1/1000)$, although the dielectric dissipation may vary depending on the type and content of magnetic powder of the toner. The dielectric dissipation of given toner particles is defined as follows. Toner particles are molded by compression into a disc having a diameter of 50 mm and thickness of 2 mm, to which are applied solid electrodes, and an LCR meter (for example, 4284A by Hewlet-Puckard) is used to determine the dielectric dissipation (Tan δ) of the disc by applying AC voltage of 0.1 KV peak-to-peak height at a frequency of 1 KHz.

The present toner preferably has an Izod impact value in the range of 0.1 to 30 kg·cm/cm. The Izod value of given toner particles may be determined as follows. Toner particles are heated to be melted and molded to form a plate-like test piece. The test piece is subjected to measurement in accordance with JIS Standard K-7110 (Impact test of hard plastics).

The present toner preferably has a melt index in the range of 10 to 150 g/10 min. The melt index of given toner particles may be determined in accordance with JIS Standard K-7210 (Method A). Measurement should be done at 125° C. with a weight of 10 kg applied.

The present toner preferably has a melt starting temperature in the range of 80 to 180° C., and a 4 mm descending temperature in the range of 90 to 220° C. The melt start temperature and 4 mm descending temperature of given toner particles are defined as follows. Toner particles are molded by compression into a column having a diameter of 10 mm and a thickness of 20 mm, and the columnar test piece is mounted to a heat melt tester such as a flow tester (for example, CFT-500C by Shimadzu) with a load of 2 MPa (20 kgf/cm$^2$), and the melt starting temperature and 4 mm descending temperature are determined by measuring the temperatures at which the piston starts to fall as a result of the onset of melting, and at which the piston falls by 4 mm, respectively.

The present toner preferably has a glass transition temperature (Tg) in the range of 35 to 80° C., more preferably 40 to 75° C. The glass transition temperature of given toner particles are defined as follows. Toner particles are heated at a specified rate, quenched, and heated again, and the glass transition temperature of the toner particles is determined based on peak phase change encountered during reheating. If a toner has its Tg below 35° C., its resistance to offsetting and storage stability tend to be impaired. On the contrary, if a toner has its Tg over 80° C., its fixation strength tends to decline.

In the heat absorption curve obtained by DSC measurement, the present toner preferably has a maximum peak in the range of 70 to 120° C.

The present toner preferably has a melt viscosity in the range of 1000 to 50000 poise, more preferably 1500 to 38000 poise. The melt viscosity of given toner particles are defined as follows. Toner particles are molded by compression into a column having a diameter of 10 mm and a thickness of 20 mm, the columnar test piece is mounted to a heat melt tester such as a flow tester (for example, CFT-500C by Shimadzu), and the viscosity is determined under a load of 2 MPa (20 kgf/cm$^2$).

The present toner preferably contains at least 1 mg of a mono azo iron complex compound which resides on the surface of toner particles to serve as a charge control agent, for each 1 g of toner. The amount of the mono azo iron complex compound adsorbed to the surface of toner particles is determined by thoroughly washing the toner particles with a solvent such as ethanol to which the resin coat of toner, coloring agent and wax are all insoluble but to which only the mono azo iron complex compound is soluble, determining the concentration of the complex compound in the supernatant by measuring the absorption of light by the supernatant, and comparing the measurement with a calibration curve.

The mono azo iron complex compound adsorbed to the surface of toner particles of the present invention preferably has a volume average particle diameter in the range of 0.05 to 3 μm, more preferably 0.1 to 1 μm. When the charge controlling agent adsorbed to the surface of toner particles has a volume average particle diameter below 0.05 μm, the charge controlling agent cannot exert satisfactorily its assigned function. On the contrary, when the volume average particle diameter is over 3 μm, the amount of charge controlling agent to be lost during frictional charging would be increased, which would lead to the reduction of charge level as a result of the carrier being soiled, development of fogging as a result of the increase of oppositely charged toner particles, and dispersion of stray particles in the machine. The particle size of the mono azo iron complex compound adsorbed to the surface of toner particles may be determined as follows. A specified amount of toner particles are melted by heating and formed into a film. The film is observed with a polarization microscope equipped with a CCD camera (for example, BH-2 by Olympus) under 500× magnification, such that only mono azo iron complex compound particles in toner come into view. The picture is transferred to an image analysis unit (for example, Luzex FS by Nireco), and the particle size distribution of individual iron complex compound particles is obtained by image analysis. In a separate run, toner particles which have been deprived of mono azo complex compound from their surface are treated in the same manner to form a film, and of the film the same size distribution is obtained. By comparing the size distribution of particles of mono azo iron complex compound in overall toner and the size distribution of particles of the same compound limited to the interior of toner, it is possible to estimate the size distribution of the compound limited to the surface of toner particles. From the thus obtained size distribution of mono azo iron complex compound limited to the surface of toner particles, the average diameter of the compound particles limited to the surface of toner particles is obtained.

The present toner preferably is those toners such that the residual fraction insoluble in a solvent of the toner (insoluble fraction in a solvent) is 0 to 30 mass % as the insoluble part in THF, 0 to 40 mass % as the insoluble part in ethyl acetate, and 0 to 30 mass % as the insoluble part in chloroform. The insoluble fraction of a toner in a solvent is determined by dissolving and/or dispersing 1 g of toner to 100 ml of a solvent chosen from THF, ethyl acetate, and chloroform, filtering the solution/suspension under pressure, drying the filtrate, and weighing the residue. The insoluble fraction of toner is determined from the weight of the residue.

The present toner can be used for one-component image development representing one of image reproduction methods.

One-component image development comprises rendering a toner to a thin film, and applying the film to a latent image, to develop an image therefrom. Rendering a toner to a thin film may be achieved usually by a unit provided with a toner carrying member, toner layer thickness adjusting member, and toner feed supporting member in which the toner feed supporting member and toner carrying member, and the toner layer thickness adjusting member and toner carrying member are connected side by side.

A case in which a toner of the invention is used for two-component image development will be detailed below. Two-component image development is based on the use of a developer comprising a toner and a carrier (serving as charge supplier and toner carrier). The carrier is made of a magnetic material or glass bead as described above. The developer (toner and carrier) is stirred by a stirring member so that it is allowed to generate a specific amount of static electricity, and carried via a magnet roller to a development position. The developer is held to the surface of magnet roller via magnetic force, and forms a magnetic brush whose height is adjusted to a specified level by a developer restriction plate. With the rotation of development roller, the developer moves on the roller, and is brought into contact with, or placed opposite with a specified gap to a latent image, to make the latent image visible. If development of image is achieved by placing developer opposite with a gap to a latent image, DC electric field may be generated between the developer and the latent image holding body so that toner will be given a driving force sufficiently strong for it to fly across the gap. To enhance the clearness of image, AC field may be overlapped.

EXAMPLE 1

The present invention will be further described by means of examples. However, those examples are presented not to limit the scope of the invention in any way whatsoever. "Parts" mentioned in Examples all refer to "parts by mass" unless otherwise indicated.

Production Example 1

Production of a Compound Represented by Formula (2)

57.4 parts of 4-Chloro-2-aminophenol was added to 580 parts of water and 84 parts of 35% hydrochloric acid, and the mixture was stirred with cooling for dissolution. Aqueous solution, whose internal temperature was kept at 10° C. or lower, of sodium nitrite obtained by dissolving 28.2 parts of sodium nitrite in 50.7 parts of water was added dropwise to the above aqueous hydrochloric acid solution. During the operation, 50 parts of ice blocks were added as appropriate to keep the temperature at 5 to 10° C. After the dropwise addition, reaction was allowed to occur by stirring the system at 10° C. for 2 hours. To the system was added 7.3 parts of sulfamic acid, and reaction was allowed to proceed for 10 minutes. It was checked through the use of potassium iodide/starch paper that the system was devoid of remains of excess nitrite. Thus, a diazo solution was obtained.

Next, 101 parts of 3-methyl-1-(3,4-dichlorophenyl)-5-pyrrazolone was added to a mixture solution comprising 475 parts of water, 95 parts of sodium carbonate, and 840 parts of n-butanol, and the mixture was stirred at room temperature for dissolution. To the resulting solution was poured the above diazo solution. The system was stirred at 20 to 22° C. for 4 hours to cause coupling reaction to occur. Fifteen hours later, it was confirmed by checking that there was no reaction with resorcin so as to determine that the reaction had completed. 43.5 parts of a 25% aqueous solution of sodium hydroxide was added to the system, and stirred for washing. The underlying water layer was removed by decanting. Part of the reaction solution after the completion of reaction was sampled, filtered, washed with water, dried, mordanted for staining, and subjected to elementary analysis.

To the above reaction solution were added 226 parts of water, 29 parts of salicylic acid, 823.7 parts of n-butanol, and 242.4 parts of 15% aqueous sodium carbonate solution, and the mixture was stirred. To the mixture was poured 89.6 parts of 38% aqueous ferric chloride solution, and the system, while its internal temperature was raised to 30° C., was stirred for 8 hours to cause complex formation reaction to occur. Eight hours later, it was confirmed by checking the disappearance of material spot by TLC that the reaction had completed. The reaction product was separated by filtration, and washed with 1000 parts of water. The resultant product was dried in vacuo at 60° C. and found to give a quantitative weight. Thus, 98.8 parts of a target compound was obtained.

The compound thus obtained was subjected to infra-red absorption spectrum analysis, visible light absorption spectrum analysis, elementary analysis (C, H, N), atomic absorption analysis (Fe), and mass spectroscopic analysis, and it was found as a result of the analysis that the compound is a compound represented by Formula (2).

The infra-red absorption spectrum used for visible light absorption spectrum analysis was obtained by the tablet method (KBr).

An infra-red absorption spectrum obtained as described above is shown in FIG. 1 attached to the present specification. Infra-red absorption spectrum analysis was performed using a Fourier transformation infra-red spectroscopy meter FTIR-8200 provided by Shimadzu under the following condition.

Measurement mode: % T
Resolution of chart: 4.0 cm-1
Accumulation: 40
AMP gain: automatic
Detector: detector 1 (2.8 mm/sec)
Apodization: HAPP-GENGEL The results of elementary analysis were as represented in the table below.

TABLE 1

| | Compound of Formula 2 | | Mordant (intermediate) | |
|---|---|---|---|---|
| | Observed | Calculated | Observed | Calculated |
| C(%) | 44.14 | 45.32 | 48.58 | 48.33 |
| H(%) | 2.24 | 2.26 | 2.91 | 2.79 |
| N(%) | 12.80 | 13.21 | 14.00 | 14.09 |
| Cl(%) | 24.50 | 25.08 | 24.92 | 26.75 |
| Fe(%) | 7.44 | 6.58 | — | — |

Production Example 2

Production of Another Compound Represented by Formula (2)

68 parts of 4-Chloro-2-aminophenol was added to 500 parts of water and 147 parts of 35% hydrochloric acid, and the mixture was stirred with cooling for dissolution. Aqueous solution, whose internal temperature was kept at 10° C. or lower, of sodium nitrite obtained by dissolving 33.4 parts of sodium nitrite in 61.6 parts of water was added dropwise to the above aqueous hydrochloric acid solution. During the operation, 40 parts of ice blocks were added as appropriate to keep the temperature at 5 to 10° C. After the dropwise addition, reaction was caused to occur by stirring the system at 10° C. for 2 hours. To the system was added 6.8 parts of sulfamic acid, and reaction was allowed to proceed for 10 minutes. It was checked through the use of potassium iodide/starch paper that the system was devoid of remains of excess sodium nitrite. Thus, a diazo solution was obtained.

Next, 117.5 parts of 3-methyl-1-(3,4-dichlorophenyl)-5-pyrrazolone was added to a mixture solution comprising 616 parts of water, 113.6 parts of sodium carbonate, and 660 parts of n-butanol, and the mixture was stirred at room temperature for dissolution. To the resulting solution was poured the above diazo solution. The resultant mixture was stirred at 20 to 22° C. for 4 hours to cause coupling reaction to occur. Fifteen hours later, it was confirmed by checking that there was no reaction with resorcin so as to confirm that the reaction had completed. The reaction product was separated by filtration, washed with 1000 parts of water, dried in vacuo at 60° C., and found to give a quantitative weight. Thus, 182 parts of a mordant was obtained.

To 180 parts of the above mordant were added 226 parts of water, 37.5 parts of salicylic acid, 905.8 parts of MIBK, and the resultant mixture was stirred at room temperature for 1 hour. To the mixture were poured 312 parts of a 25% aqueous sodium acetate solution and 135.4 parts of a 38% aqueous ferric chloride solution, and the resultant mixture, while its internal temperature was raised to 40° C., was stirred for 8 hours to cause complex formation reaction to occur. Eight hours later, it was confirmed by checking the disappearance of material spot by TLC so as to determine that the reaction had completed. The reaction product was separated by filtration, and washed with 1000 parts of water. The resultant product was dried in vacuo at 60° C. and found to give a quantitative weight. Thus, 187 parts of another target compound was obtained.

The compound thus obtained was subjected to infra-red absorption spectrum analysis, visible light absorption spectrum analysis, elementary analysis (C, H, N, Cl), atomic absorption analysis (Fe), and mass spectroscopic analysis, and it was found as a result of the analysis that the compound is a compound represented by Formula (2). The infra-red absorption spectrum analysis was performed by the tablet method (KBr).

TABLE 2

Compound of Example (2)

|  | Observed | Calculated |
|---|---|---|
| C(%) | 45.18 | 45.32 |
| H(%) | 2.33 | 2.26 |
| N(%) | 13.00 | 13.21 |
| Cl(%) | 25.52 | 25.08 |
| Fe(%) | 8.64 | 6.58 |

Comparative Charge Controlling Agent 1

As a comparative charge controlling agent 1 was used a conventional charge controlling agent made of an iron azo complex (T-77 provided by Hodogaya Chemicals) having a structure as represented by the following Formula wherein a+b+c=1.

Comparative Charge Controlling Agent 2

As a comparative charge controlling agent 2 was used a conventional charge controlling agent made of a chromium azo complex (T-95 provided by Hodogaya Chemicals) having a structure as represented by the following Formula.

[Formula 8]

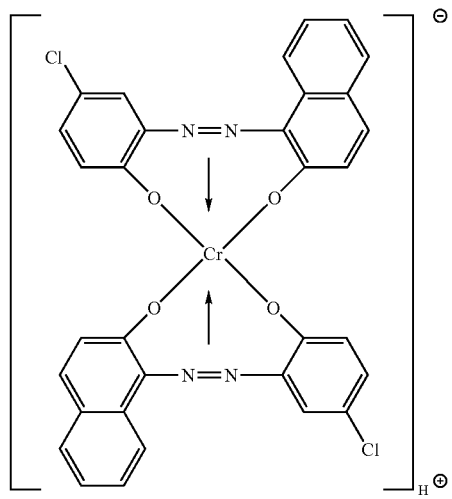

Comparative Charge Controlling Agent 3

As a comparative charge controlling agent 3 was used a conventional charge controlling agent made of a chromium azo complex (TRH provided by Hodogaya Chemicals) having a structure as represented by the following Formula.

[Formula 9]

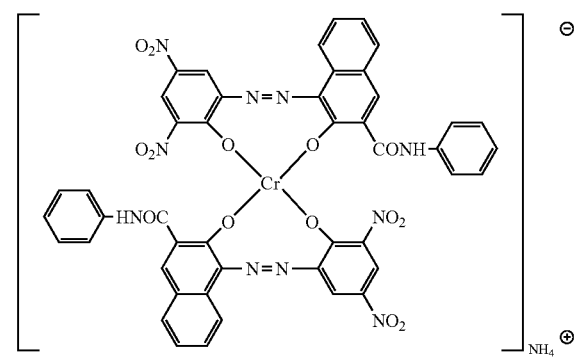

[Formula 7]

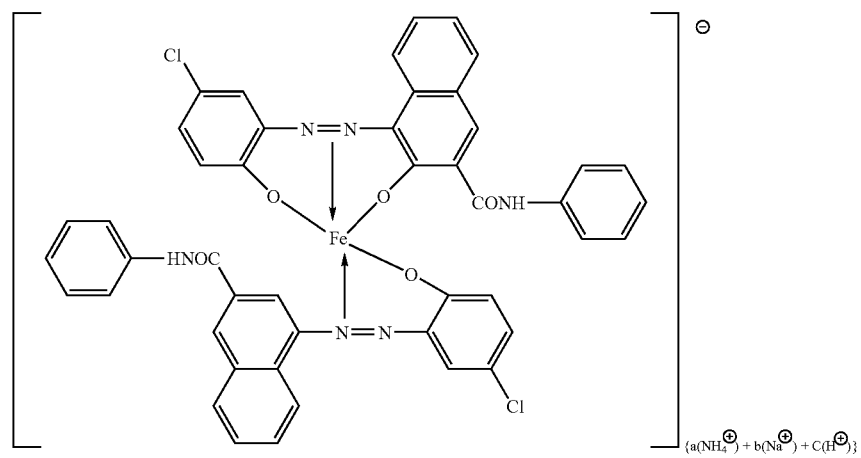

Comparative Charge Controlling Agent 4

As a comparative charge controlling agent 4 was used a mono azo iron complex compound similar to that of Formula 2 obtained by a method similar to that used in Production example 1.

[Formula 10]

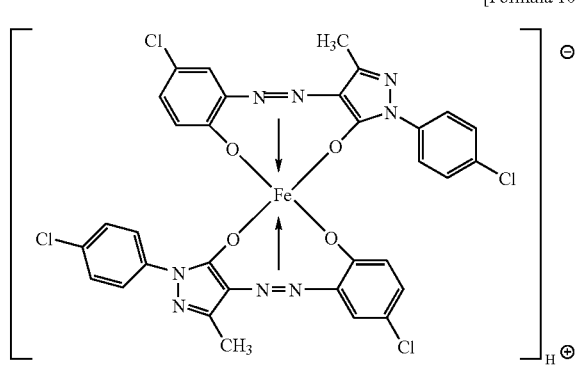

EXAMPLE 2

Each of the three components cited below was precisely weighed such that their total weight was equal to 100 parts. Thus, five kinds of mixtures were obtained in which the present compound (2) occurred at 0.25, 0.50, 0.75, 1.00, and 2.00 mass %. Each of the five kinds of mixtures was mixed with a juicer mixer 60 times intermittently. The mixture having undergone the preliminary mixing was transferred to a continuous extrusion kneader (model KRC-S-1, Kurimoto Steel Works) to be melt-mixed. The operation condition of the kneader consisted of: jacket temperature, 110° C.; paddle revolution, 130 rpm; feed amount of material, 700 g/hr. After cooling, the mass is broken into coarse pieces with a hammer mill. After coarse breaking, the pieces were transferred to a jet mill pulverizer (Nippon Pneumatic) to be pulverized into fine powder. The powder was classified by an airflow classifier (Nippon Pneumatic) and a standard toner comprising particles having a volume average particle diameter of 10±0.5 μm was obtained.

Styrene-acryl copolymer resin (acid value being 0.1 mg KOH/g) (CPR-100, Mitsui Chemicals) 94.75, 94.5, 94.25, 94.0, and 93.0 parts Mono azo iron complex compound obtained in Production Example 1 and having a structure as represented by Formula (2) 0.25, 0.5, 0.75, 1.0, and 2.0 parts Carbon black (MA-100, Mitsubishi Chemicals) 5.0 parts 1 g of this standard toner and 25 g of a non-coat ferrite carrier (F-100, Powder-Tech) (screened with 100 mesh) were precisely weighed and transferred to a PP vessel which was then exposed to a measurement environment (25° C., 50% RH) for 12 hours or longer. The toner was charged via the rotation of a ball mill (110 rpm), and samples were taken out at specified time intervals. The charge amount of each sample was measured with a blow-off powder charge meter (Toshiba Chemicals) (nitrogen pressure: 0.1 MPa (1.0 Kg/cm²)). Sampling was made at 10, 30, 60, 180, 360, 720, and 1800 sec after the onset of rotation, charge amounts at respective time intervals were plotted, and the time constant (τ) was determined which indicates the initial increase in charging. The same measurement was repeated twice, and two measurements were averaged to give a mean. The charge amount obtained at 1800 sec (30 minutes) after the onset of rotation was taken to represent a saturated charge level which serves as a parameter to indicate the performance of a test charge controlling agent or of a test toner.

The time constant (τ) was determined by collecting samples at specified intervals after the onset of charging, measuring the charge amount of each sample with a blow-off charge meter, calculating ln(qmax−q) for each charge amount according to the equation cited below (J. Electrophoto. Soc., 27(3):307, 1988), plotting ln(qmax−q) values as a function of time t, and determining the time constant τ from the graph.

$$(q_{max}-q)/(q_{max}-q_0)=\exp(-t/\tau)$$

wherein $q_{max}$ represents the saturated charge amount, $q_0$ initial charge amount (charge amount 10 sec after the onset of charging in this case), t time at which measurement was made, and q charge amount at time t. Charging with a rapid initial increase has a small time constant. The time constant is expressed in seconds.

The result obtained from a toner supplemented with the present compound represented by Formula (2) is shown in Table 3 below together with the results obtained from corresponding toners supplemented with comparative charge controlling agents 1 to 4. Based on the data shown in Table 3, the tribocharge amounts obtained at 1800 sec after the onset of charging are plotted for various toners as a function of the addition amount of a charge controlling agent as shown in FIG. 2. The time constants (τ) of various toners are plotted as a function of the addition amount of a charge controlling agent as shown in FIG. 3.

TABLE 3

| Addition amount (%) | Compound of Formula (2) | | Comp. Charge controller 1 | | Comp. Charge controller 2 | | Comp. Charge controller 3 | | Comp. Charge controller 4 | |
|---|---|---|---|---|---|---|---|---|---|---|
| | Charge amount | Time constant | Charge amount | Time constant | Charge amount | Time constant | Charge amount | Time constant | Charge amount | Time constant |
| 0.25% | −25.82 | 474 | — | — | — | — | — | — | −19.46 | 410 |
| 0.5% | −25.81 | 233 | −15.75 | 281 | −17.79 | 294 | −20.54 | 411 | −19.96 | 320 |
| 0.75% | −25.60 | 175 | — | — | — | — | — | — | −20.46 | 200 |
| 1.0% | −25.67 | 145 | −17.79 | 240 | −19.44 | 278 | −22.78 | 345 | −20.99 | 159 |
| 2.0% | −27.01 | 102 | −20.67 | 177 | −22.26 | 207 | −22.96 | 233 | −22.65 | 109 |

Comparative Examples 1-4

Test Using Comparative Charge Controlling Agents

Instead of the compound obtained in Production example 1 and represented by Formula (2), comparative charge controlling agents 1, 2, 3, and 4 were prepared and treated in the same manner as in Example 1 to produce standard toners of which charge amounts and time constants were determined. However, tests on toners supplemented with comparative charge controlling agents 1 to 3 at 0.25% and 0.75% were omitted. Tests performed on toners supplemented with comparative charge controlling agents 1 to 4 were termed Comparative examples 1 to 4, respectively, and their results are shown in Table 3.

As is clear from the results shown in the table, the toner supplemented with the present compound exhibits a markedly high charge amount (in terms of absolute value) exceeding 25 µC/g and markedly rapid initial increase in charging, as compared with conventional toners. It is recognized that the present toner incorporating the compound has a rapid initial increase in charging, despite that its charge level is very high. Moreover, the toner incorporating the present compound exhibits a markedly high charge amount, even when the addition amount of the compound is as low as 1.0 mass % or lower. It is also recognized that the present toner incorporating the compound, even when the addition amount of the compound is not more than 1.0 mass %, has a very rapid initial increase in charging, despite that its charge level is markedly high. This feature is still clearer by comparing the toner under study with a toner incorporating comparative charge controlling agent 4 made of a compound which has single chlorine atom for every phenyl group of pyrazolone ring, that is, compound very similar in structure to the compound of the invention: the comparison shows that the present toner incorporating the compound, even though at a small concentration of not more than 1.0 mass %, has an unexpectedly high charge level and exhibits a rapid initial increase in charging as compared with those of the comparative toner.

EXAMPLE 3

Stability Test to the Variation of Environment 1 g of a standard toner prepared in Example 2 and 25 g of a non-coat ferrite carrier (F-100, Powder-Tech) were precisely weighed and transferred to a PP vessel which was then transferred to a thermohygrostat (LH-30, Nagano Kagaku) where the vessel was exposed to a measurement environment as cited below for 12 hours or longer. Under the measurement environment, the toner was charged via the rotation of a ball mill for 30 minutes. The charge amount of toner was measured with a blow-off powder charge meter (Toshiba Chemicals) (nitrogen pressure: 0.1 MPa (1.0 Kg/cm$^2$). The measurement environment consisted of a normal environment (25° C., 50% relative humidity (RH)), low temperature/low humidity environment (10° C., 30% RH), and high temperature/high humidity environment (35° C., 85% RH) The results of test are shown in Table 4 below. The same results are also shown in FIG. 4.

Comparative Examples 5-7

Stability Test to the Variation of Environment

Toners incorporating comparative charge controlling agents 1 to 3 were prepared in the same manner as in Example 3, and tested for their stability against the variation of environment. The results are shown in Table 4 and in FIG. 4 together with the results obtained from the test toner.

From the results shown in the table and figure, it is recognized that the present toner incorporating the charge controlling agent, which exhibits a high charge amount and rapid initial increase in charging as compared with comparative toners, still maintains its high performance even when it is exposed to high temperature/high humidity environment.

TABLE 4

|  | 10° C., 30% RH | 25° C., 50% RH | 35° C., 85% RH |
| --- | --- | --- | --- |
| Compound of Formula (2) | −27.11 | −26.13 | −23.91 |
| Comp. Charge controller 1 | −20.44 | −18.39 | −16.22 |
| Comp. Charge controller 2 | −20.42 | −19.54 | −15.78 |
| Comp. Charge controller 3 | −22.41 | −21.31 | −19.42 |

EXAMPLE 4

Charge Amount Depending on the Number of Kneading and Dispersion Tendency Depending on the Number of Kneading The toner prepared in Example 2 was fed again to the continuous extrusion kneader, and a standard toner was prepared anew by the same method as had been used for the production of the standard toner in Example 2. For this once recycled toner, the charge amount and time constant were determined in the same manner as in Example 2. The one time recycled toner was fed a second time to the continuous extrusion kneader, and standard toner was prepared a second time by the same method as had been used for the production of the standard toner in Example 2. For this twice recycled toner, the charge amount and time constant were determined in the same manner as in Example 2. The results are shown in FIGS. 5 and 6.

Comparative Examples 8-10

Charge Amount Depending on the Number of Kneading and Dispersion Tendency Depending on the Number of Kneading Toners incorporating comparative charge controlling agents 1 to 3 were treated in the same manner as in Example 2, to test the effects of repeated kneading on the charge amount and dispersion tendency of recycled toners. The results are shown in FIGS. 5 and 6.

As is clear from the results shown in the table and figures, the toner supplemented with the present mono azo complex compound exhibits comparatively small changes in its charge amount and initial increase in charging, even when it has undergone repeated kneading, that is, the toner maintains excellent dispersibility even when it has undergone repeated kneading.

EXAMPLE 5

A standard toner was prepared as in Example 2, to which a non-coat ferrite carrier (F-150, Powder-Tech) (screened with 150 mesh) having a particle size smaller than the non-coat ferrite carrier F-100 was added. The resulting toner was charged, and samples were taken out at specified time intervals as in Example 2. The charge amount and time constant (τ) representative of initial increase in charging of each sample was determined. The same measurement was repeated twice, and two measurements were averaged to give a mean. The charge amount obtained at 1800 sec (30 minutes) after the onset of charging was taken to represent a saturated charge level which serves as a parameter to indicate the performance of a test charge controlling agent or of a test toner. The time constant (τ) of a toner was determined as in Example 2.

The results obtained from the toner supplemented with the present compound represented by Formula (2) are listed in Table 5 together with the results obtained from toners supplemented with comparative charge controlling agents 4. Based on the data listed in Table 5, the tribocharge level of toner obtained at 1800 sec after the onset of charging is plotted as a function of the addition amount of the present compound represented by Formula (2) and of a comparative charge controlling agent as shown in FIG. 7. FIG. 8 shows two graphs, for each of which the time constant (τ) of a toner is plotted as a function of the amount of a charge controlling agent added to the toner.

TABLE 5

| Addition amount (%) | Compound of Formula (2) | | Comp. Charge controller 4 | |
| --- | --- | --- | --- | --- |
| | Charge amount | Time constant | Charge amount | Time constant |
| 0.25% | −29.97 | 323 | −28.51 | 333 |
| 0.5% | −32.46 | 196 | −30.12 | 303 |
| 0.75% | −32.72 | 179 | −30.34 | 185 |
| 1.0% | −32.84 | 164 | −30.65 | 163 |
| 2.0% | −33.50 | 93 | −30.49 | 118 |

As seen from the above results, for toners supplemented with a non-coat ferrite carrier F-150 having a particle size smaller than the non-coat ferrite carrier F-100, the toner supplemented with the present compound exhibits a markedly high charge amount (in terms of absolute value) exceeding 25 μC/g as compared with conventional toners. It is further recognized that the toner incorporating the present compound has a rapid initial increase in charging, despite that its charge level is very high. Moreover, the toner incorporating the present compound exhibits a markedly high charge amount, even when the addition amount of the compound is as low as 1.0 mass % or lower. It is also recognized that the present toner incorporating the compound, even when the compound is added at a low concentration, has a very rapid initial increase in charging, despite that its charge level is high. This feature is still clearer by comparing the toner under study with a toner incorporating comparative charge controlling agent 4 made of a compound which has single chlorine atom for every phenyl group of pyrazolone ring, that is, compound very similar in structure to the present compound: the comparison shows that the present toner incorporating the compound, even though at a small concentration of not more than 1.0 mass %, has an unexpectedly high charge level and exhibits a rapid initial increase in charging as compared with those of the comparative toner.

EXAMPLE 6

Stability Test to the Variation of Environment

Procedures of Example 3 were repeated except that non-coat ferrite carrier F-150 was used instead of non-coat ferrite carrier F-100. The toner was charged for 30 minutes. The test toner, as soon as it was taken out of a thermohygrostat, had its charge measured. The measurement environment consisted, as in Example 3, of a normal environment (25° C., 50% RH), low temperature/low humidity environment (10° C., 30% RH), and high temperature/high humidity environment (35° C., 85% RH). The results of test are shown in Table 6 below. The same results are also shown in FIG. 9.

TABLE 6

| | 10° C., 30% RH | 25° C., 50% RH | 35° C., 85% RH |
| --- | --- | --- | --- |
| Compound of Formula (2) | −34.16 | −32.49 | −30.56 |

TABLE 6-continued

| | 10° C., 30% RH | 25° C., 50% RH | 35° C., 85% RH |
| --- | --- | --- | --- |
| Comp. Charge controller 4 | −31.13 | −30.33 | −28.61 |

From the results shown in the table, it is recognized as in Example 3 that the present toner incorporating the charge controlling agent, which exhibits a high charge amount and rapid initial increase in charging as compared with other conventional toners, still maintains its high performance even when it is exposed to high temperature/high humidity environment.

INDUSTRIAL APPLICABILITY

By incorporating a charge controlling agent comprising, as an active ingredient, a mono azo iron complex compound, a negatively chargeable toner can exhibit a charge level exceeding 25 μC/g (in terms of absolute value), or a level significantly higher than that of conventional toners. Despite that the toner has a high charge level, it has a rapid initial increase in charging. In addition, even if the toner contains the charge controlling agent at a concentration as low as 1.0 mass % or lower, it can still exhibit a markedly high charge level. Further, even if the toner contains the charge controlling agent at such a low concentration, it can exhibit a markedly rapid initial increase in charging, despite that its charge level is high. Therefore, it is possible for the present toner, when it is applied to a photocopier or printer, to allow for compaction of the machine, its high speed operation, contraction of wait time, and reduction of use amount of charge controlling agent. Since a negatively chargeable toner according to the present invention is highly stable to the variation of environment, it will ensure the standardized use of a copier with which it is used in combination, regardless of the nationality of its use place, of the country or region in which the copier is used, that is, regardless of climate under which the copier is operated. The present mono azo iron complex compound has an excellent dispersion tendency. Because of this, use of the present iron complex compound makes it possible to widen the selection range of coloring agents, reduce the size of toner particles, and ensure the stable production of toner. The present mono azo iron complex compound is useful for the applications incompatible with the use of chromium or nitro compounds.

Figure 1:
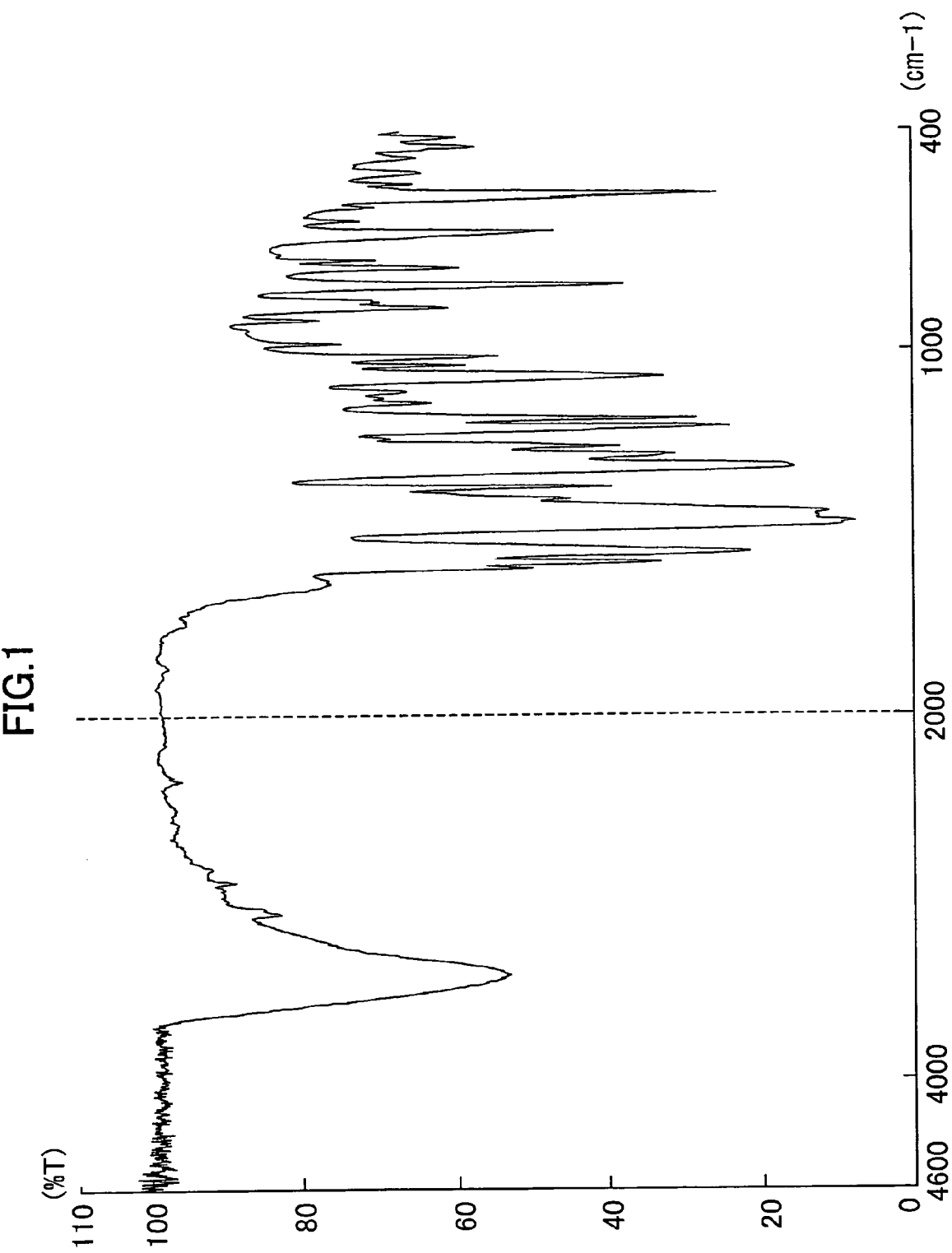
FIG. 1 is a chart representing an infra-red ray absorption spectrum of the present compound.
Figure 2:
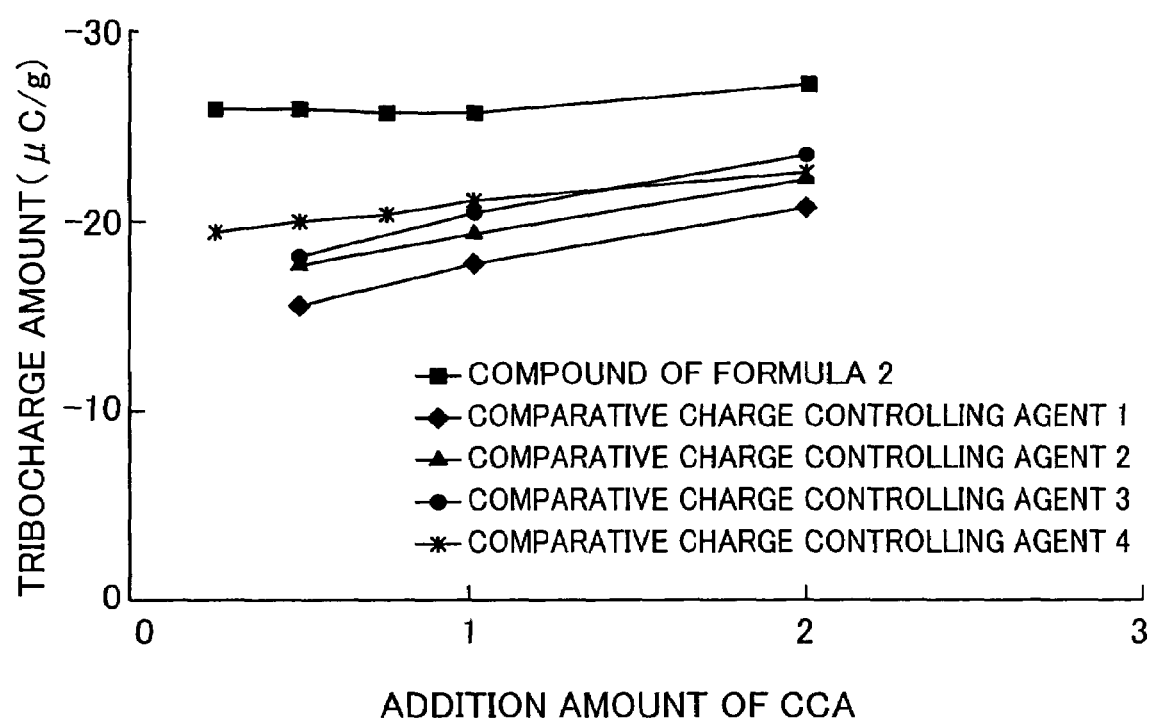
FIG. 2 shows the effects of the present compound and comparative charge controlling agents on the tribocharge measurements.
Figure 3:
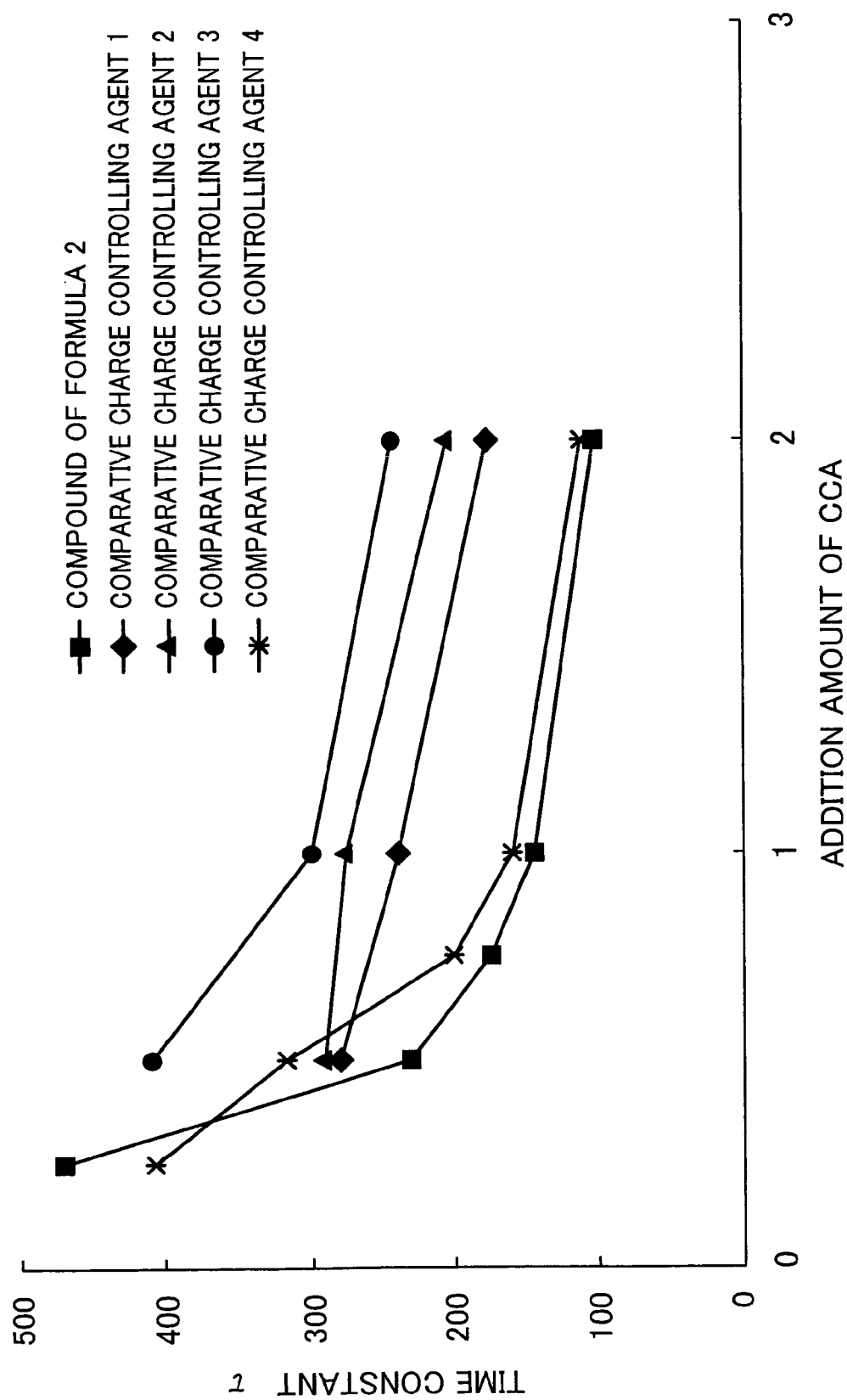
FIG. 3 shows the effects of the present compound and comparative charge controlling agents on the time constant measurements of toners supplemented with those charge controlling agents, the time constant being used for evaluating the initial increase in charging of toner.
Figure 4:
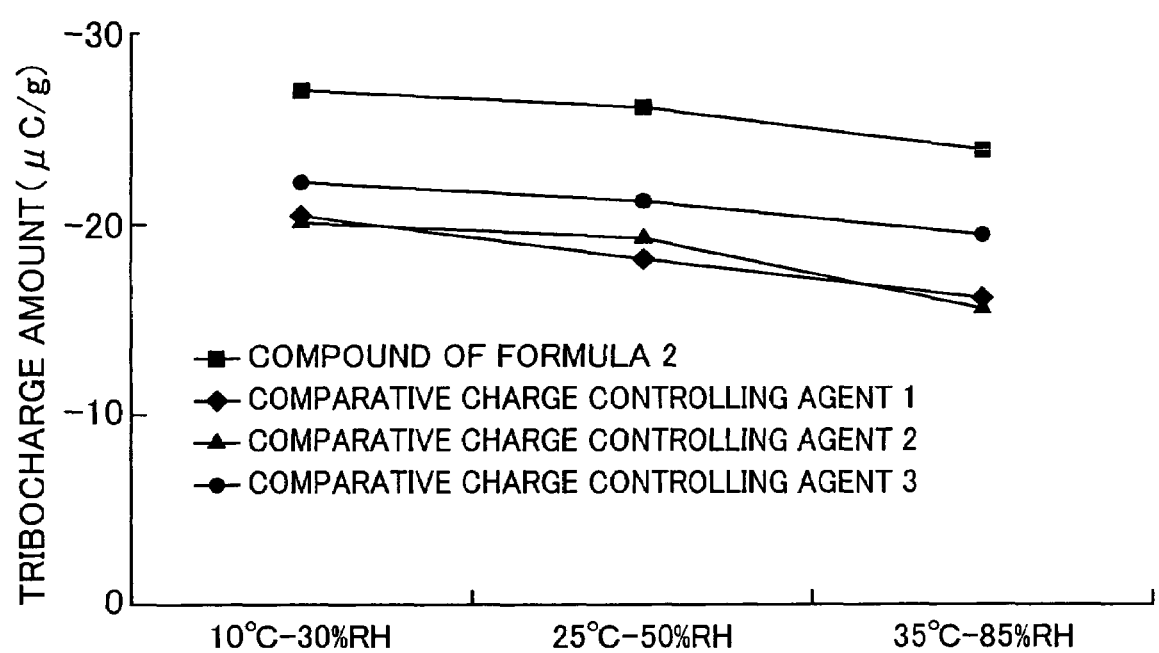
FIG. 4 shows the effects of the present compound and comparative charge controlling agents on the results of stability test evaluating the stability of toner against the variation of environment.
Figure 5:
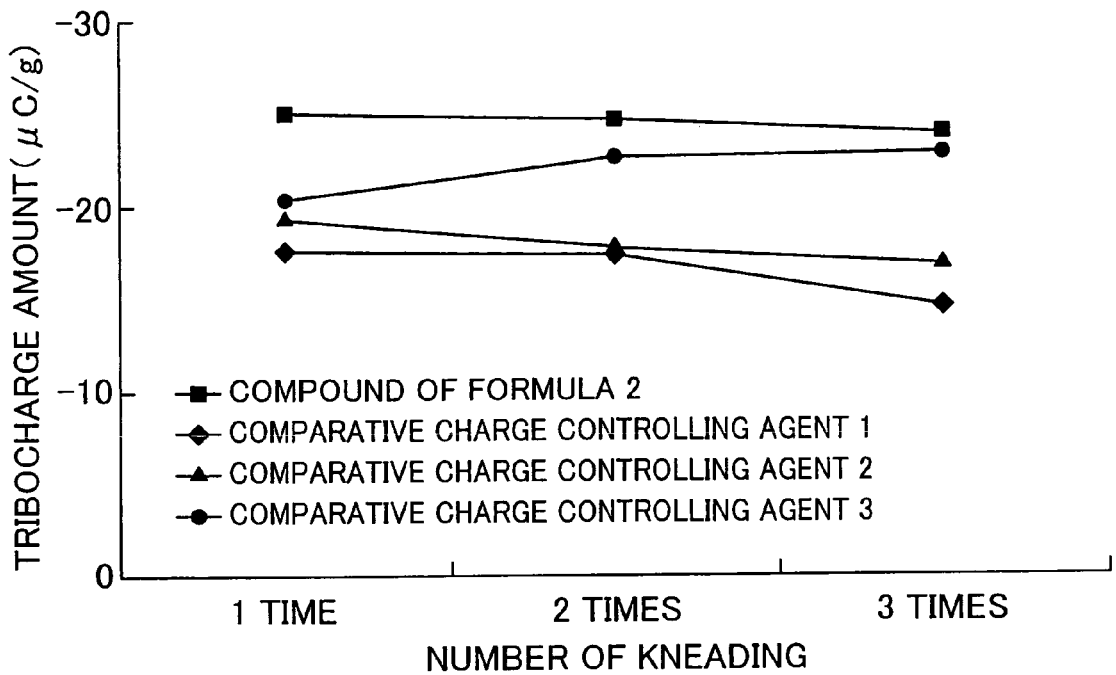
FIG. 5 shows the results of test evaluating the effect of the number of kneading on the charge level of the present compound and comparative charge controlling agents.
Figure 6:
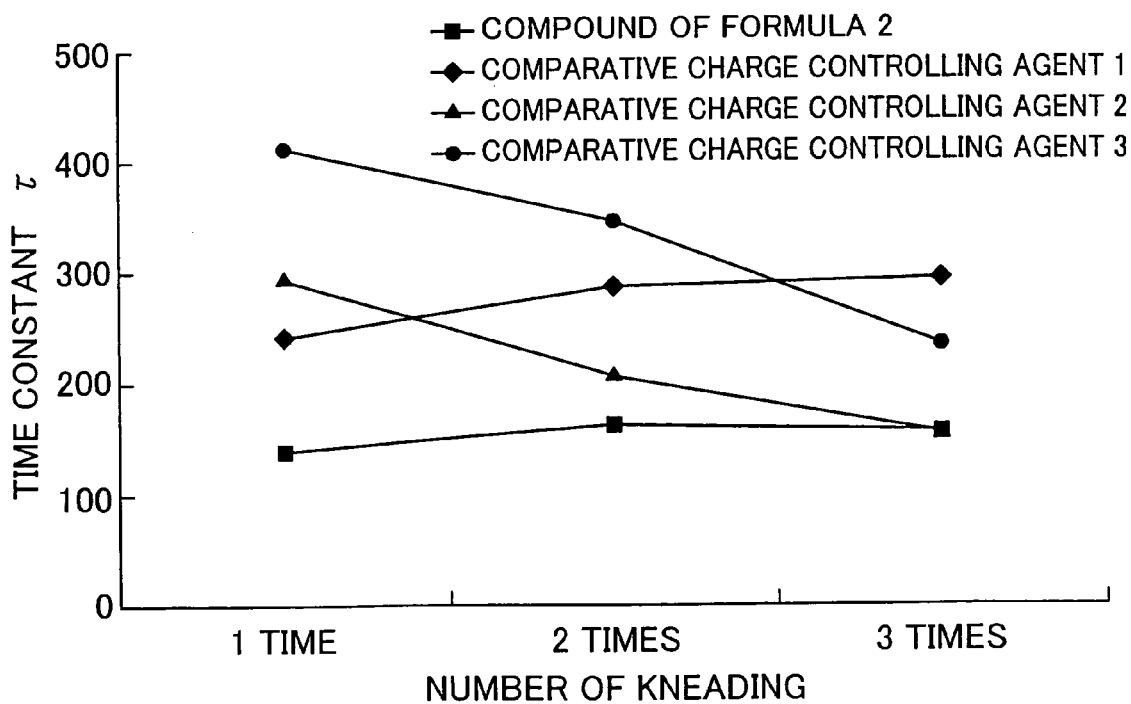
FIG. 6 shows the results of test evaluating the effect of the number of kneading on the time constant of charging of the present compound and comparative charge controlling agents.
Figure 7:
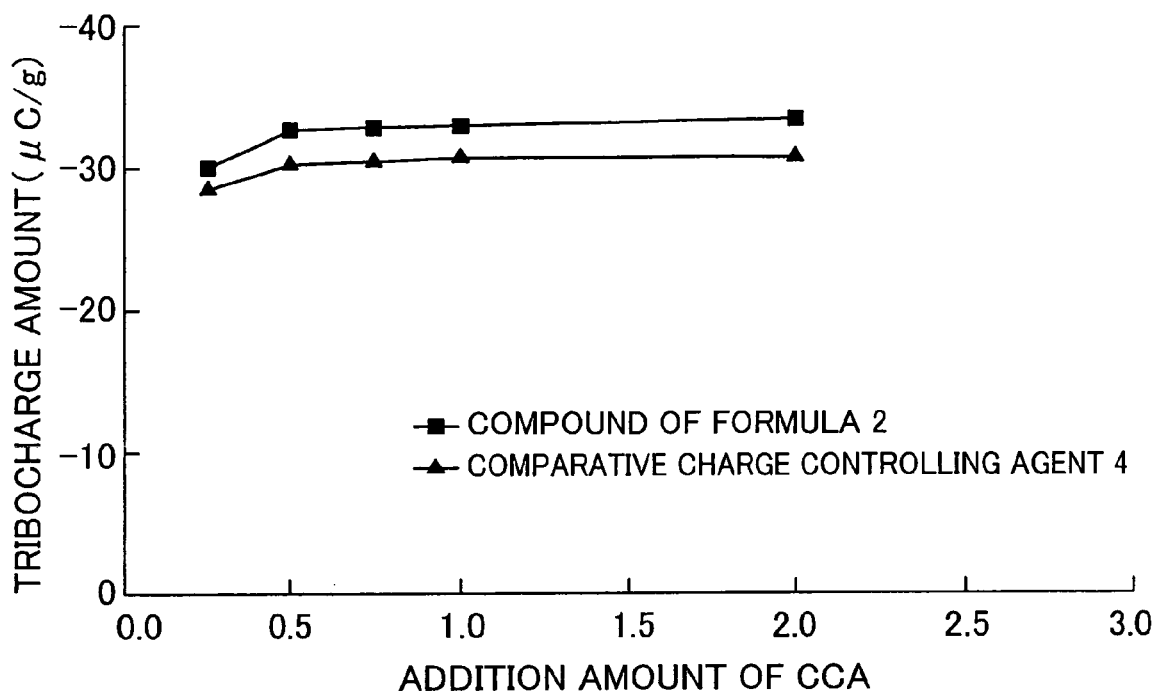
FIG. 7 shows the results of test wherein the tribocharge level is plotted as a function of the addition amount of the present compound and of a comparative charge controlling agent.
Figure 8:
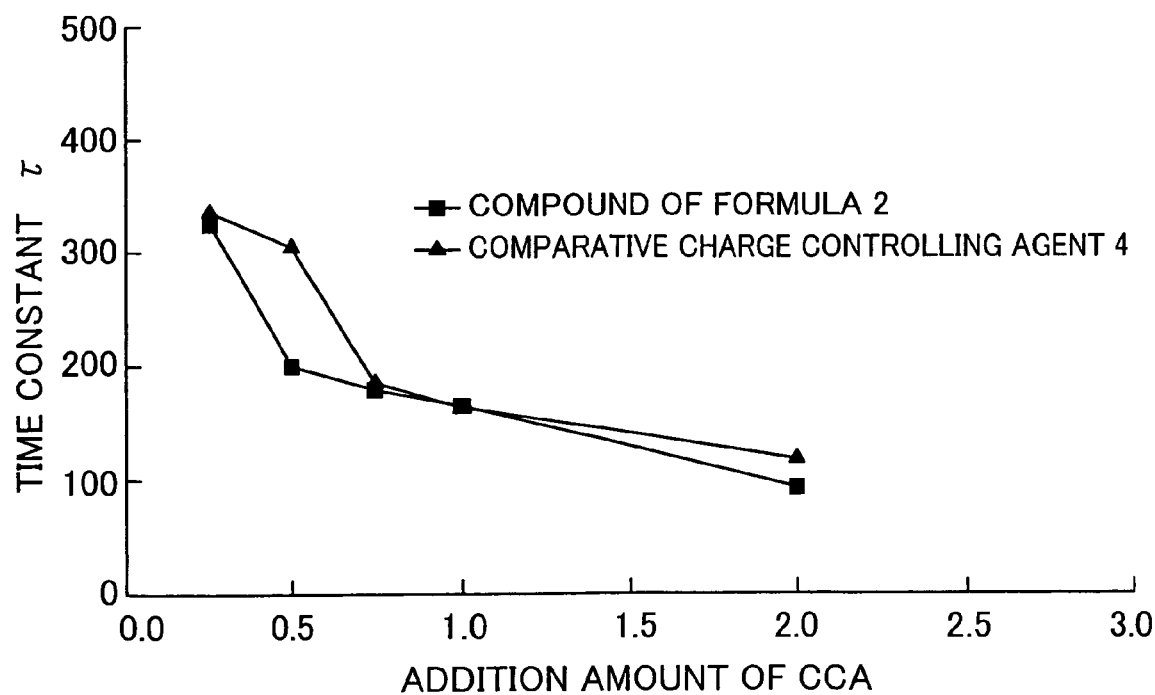
FIG. 8 shows the time constants obtained from toners supplemented with the present compound and a comparative charge controlling agent, the time constant being used for evaluating the initial increase in charging of toner.
Figure 9:
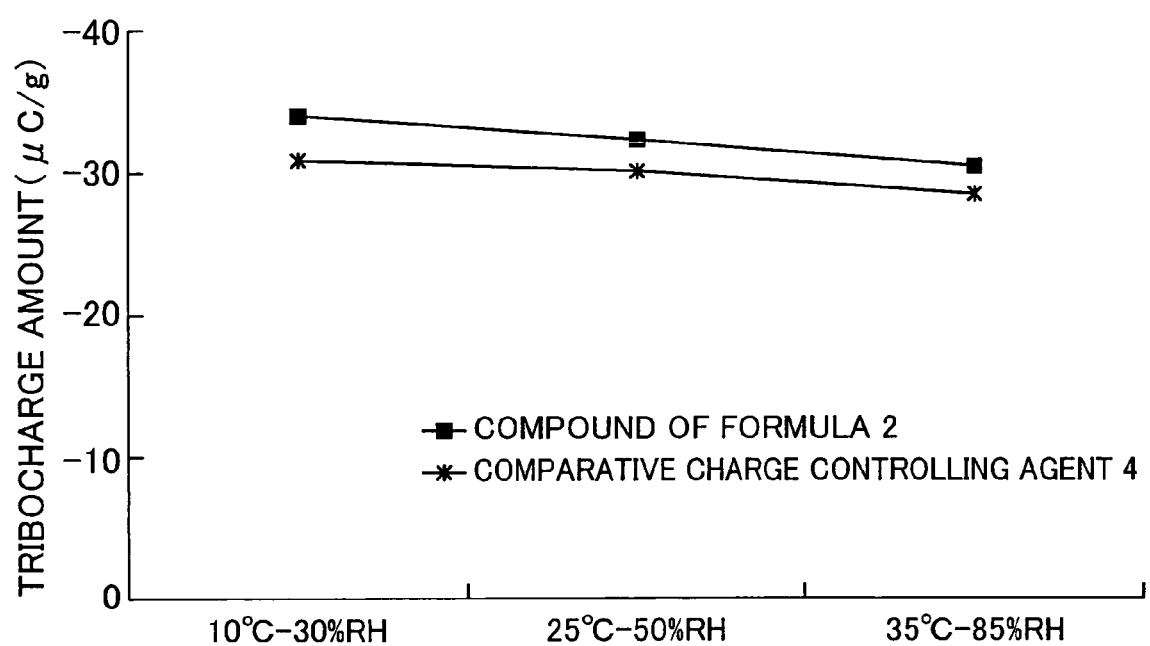
FIG. 9 shows the effects of the present compound and a comparative charge controlling agent on the results of stability test evaluating the stability of toner against the variation of environment.

What is claimed is:

1. A mono azo iron complex compound represented by Formula (1):

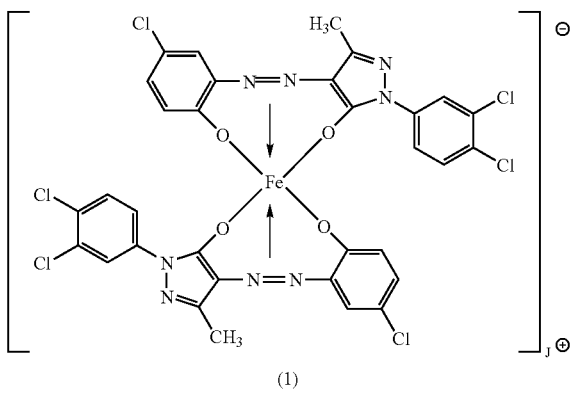

(1)

wherein J represents H, alkali metal, ammonium, or alkyl ammonium with alkyl groups having 1 to 8 carbon atoms, or two or more of these elements in combination.

2. The compound of claim 1, wherein J of Formula (1) represents a hydrogen atom.

3. A charge controlling agent comprising the mono azo iron complex compound of claim 1.

4. The charge controlling agent of claim 3, wherein J of Formula (1) represents a hydrogen atom.

5. The charge controlling agent of claim 3, wherein said charge controlling agent comprising particles having a volume average particle diameter of 0.1 to 20 μm.

6. A negatively chargeable toner comprising the mono azo iron complex compound of claim 1, a coloring agent, and a binding resin.

7. The negatively chargeable toner of claim 6, wherein J of Formula (1) represents a hydrogen atom.

8. The negatively chargeable toner of claim 6 comprising said mono azo iron complex compound in an amount of 0.1 to 5 mass %.

9. The negatively chargeable toner of claim 8 comprising said mono azo iron complex compound in an amount of 0.25 to 2 mass %.

10. The negatively chargeable toner of claim 6, wherein said binding resin has an acid value of 0.1 to 100 mgKOH/g.

* * * * *